(12) United States Patent
Xiang et al.

(10) Patent No.: US 8,972,251 B2
(45) Date of Patent: Mar. 3, 2015

(54) GENERATING A MASKING SIGNAL ON AN ELECTRONIC DEVICE

(75) Inventors: Pei Xiang, San Diego, CA (US); Joseph Jyh-huei Huang, Menlo Park, CA (US); Andre Gustavo Pucci Schevciw, San Diego, CA (US); Anthony Mauro, San Diego, CA (US); Erik Visser, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 475 days.

(21) Appl. No.: 13/155,187

(22) Filed: Jun. 7, 2011

(65) Prior Publication Data

US 2012/0316869 A1 Dec. 13, 2012

(51) Int. Cl.
*G10L 21/02* (2013.01)

(52) U.S. Cl.
USPC .......................... 704/226; 704/278; 704/200

(58) Field of Classification Search
USPC ......... 704/200–211, 226, 215, 225, 227, 214, 704/200.1, 278, 272; 600/559
See application file for complete search history.

(56) References Cited

U.S. PATENT DOCUMENTS

| 8,143,620 B1 * | 3/2012 | Malinowski et al. ........... 257/56 |
| 2004/0125922 A1 | 7/2004 | Specht |
| 2005/0031141 A1 | 2/2005 | McCrackin et al. |
| 2005/0065778 A1 | 3/2005 | Mastrianni et al. |
| 2006/0247919 A1 | 11/2006 | Specht et al. |
| 2008/0281588 A1 | 11/2008 | Akagi et al. |
| 2009/0097671 A1 | 4/2009 | Paradiso et al. |
| 2011/0257967 A1 * | 10/2011 | Every et al. ................... 704/226 |
| 2012/0053931 A1 * | 3/2012 | Holzrichter ................ 704/200.1 |
| 2012/0283593 A1 * | 11/2012 | Searchfield et al. .......... 600/559 |

OTHER PUBLICATIONS

International Search Report and Written Opinion—PCT/US2012/036393—ISA/EPO—Nov. 15, 2012.

* cited by examiner

*Primary Examiner* — Huyen X. Vo
(74) *Attorney, Agent, or Firm* — Austin Rapp & Hardman

(57) ABSTRACT

An electronic device for generating a masking signal is described. The electronic device includes a plurality of microphones and a speaker. The electronic device also includes a processor and executable instructions stored in memory that is in electronic communication with the processor. The electronic device obtains a plurality of audio signals from the plurality of microphones. The electronic device also obtains an ambience signal based on the plurality of audio signals. The electronic device further determines an ambience feature based on the ambience signal. Additionally, the electronic device obtains a voice signal based on the plurality of audio signals. The electronic device also determines a voice feature based on the voice signal. The electronic device additionally generates a masking signal based on the voice feature and the ambience feature. The electronic device further outputs the masking signal using the speaker.

40 Claims, 10 Drawing Sheets

US 8,972,251 B2

GENERATING A MASKING SIGNAL ON AN ELECTRONIC DEVICE

TECHNICAL FIELD

The present disclosure relates generally to electronic devices. More specifically, the present disclosure relates to generating a masking signal on an electronic device.

BACKGROUND

In the last several decades, the use of electronic devices has become common. In particular, advances in electronic technology have reduced the cost of increasingly complex and useful electronic devices. Cost reduction and consumer demand have proliferated the use of electronic devices such that they are practically ubiquitous in modern society. As the use of electronic devices has expanded, so has the demand for new and improved features of electronic devices. More specifically, electronic devices that perform functions faster, more efficiently or with higher quality are often sought after.

Some electronic devices (e.g., audio recorders, cellular phones, smartphones, computers, etc.) use audio or speech signals. For example, a cellular phone captures a user's voice or speech using a microphone. For instance, the cellular phone converts an acoustic signal into an electronic signal using the microphone. This electronic signal may then be stored and/or transmitted to another device (e.g., cellular phone, smart phone, computer, etc.).

In some cases, the user of an electronic device may want to keep their speech or vocal information confidential. This may be difficult if the user is in a public place. For example, a user may desire to have a confidential conversation on a cellular phone while in public at an airport, on a bus or at a park. However, this may be difficult since other people may be listening nearby. As can be observed from this discussion, systems and methods that help maintain the confidentiality of vocal or speech information may be beneficial.

SUMMARY

An electronic device for generating a masking signal is disclosed. The electronic device includes a plurality of microphones and a speaker. The electronic device also includes a processor and instructions stored in memory that is in electronic communication with the processor. The electronic device obtains a plurality of audio signals from the plurality of microphones. The electronic device also obtains an ambience signal from the plurality of audio signals. Additionally, the electronic device determines an ambience feature based on the ambience signal. The electronic device further obtains a voice signal from the plurality of audio signals. The electronic device also determines a voice feature based on the voice signal. A masking signal is generated by the electronic device based on the voice feature and the ambience feature. The electronic device further outputs the masking signal using the speaker. The electronic device may also transmit the voice signal. The electronic device may be a wireless communication device. The electronic device may include a plurality of speakers.

The electronic device may also obtain a sound signal. Generating the masking signal may be further based on the sound signal. The sound signal may include music. Generating the masking signal may include adjusting the amplitude of the sound signal in a direct relationship with an envelope signal based on the voice signal. Generating the masking signal may include adjusting the amplitude of the sound signal in an inverse relationship with an amplitude based on the ambience signal. The sound signal may be selected based on an input. Generating the masking signal may include amplitude modulating the voice signal based on the voice feature.

The voice feature may include amplitude characteristics, spectral characteristics, spatial characteristics or temporal characteristics. The voice feature may include a loudness envelope. The ambience feature may include amplitude characteristics, spectral characteristics, spatial characteristics or temporal characteristics. The ambience feature may include a loudness characteristic.

Obtaining the voice signal may include removing the ambience signal from the plurality of audio signals. Obtaining the voice signal may include removing one or more echo signals from the plurality of audio signals using an echo canceller.

A method for generating a masking signal on an electronic device is also disclosed. The method includes obtaining a plurality of audio signals from a plurality of microphones. The method also includes obtaining an ambience signal from the plurality of audio signals. The method further includes determining an ambience feature based on the ambience signal. Additionally, the method includes obtaining a voice signal from the plurality of audio signals. The method also includes determining a voice feature based on the voice signal. Generating a masking signal based on the voice feature and the ambience feature is also included in the method. The method additionally includes outputting the masking signal using a speaker.

A computer-program product for generating a masking signal is also disclosed. The computer-program product includes a non-transitory tangible computer-readable medium with instructions. The instructions include code for causing an electronic device to obtain a plurality of audio signals from a plurality of microphones. The instructions also include code for causing the electronic device to obtain an ambience signal from the plurality of audio signals. The instructions further include code for causing the electronic device to determine an ambience feature based on the ambience signal. Additionally, the instructions include code for causing the electronic device to obtain a voice signal from the plurality of audio signals. Code for causing the electronic device to determine a voice feature based on the voice signal is also included in the instructions. The instructions also include code for causing the electronic device to generate a masking signal based on the voice feature and the ambience feature. The instructions additionally include code for causing the electronic device to output the masking signal using a speaker.

An apparatus for generating a masking signal is also disclosed. The apparatus includes means for obtaining a plurality of audio signals from a plurality of microphones. The apparatus also includes means for obtaining an ambience signal from the plurality of audio signals. The apparatus further includes means for determining an ambience feature based on the ambience signal. Additionally, the apparatus includes means for obtaining a voice signal from the plurality of audio signals. Means for determining a voice feature based on the voice signal are also included in the apparatus. The apparatus also includes means for generating a masking signal based on the voice feature and the ambience feature. The apparatus further includes means for outputting the masking signal using a speaker.

DETAILED DESCRIPTION

Figure 1:
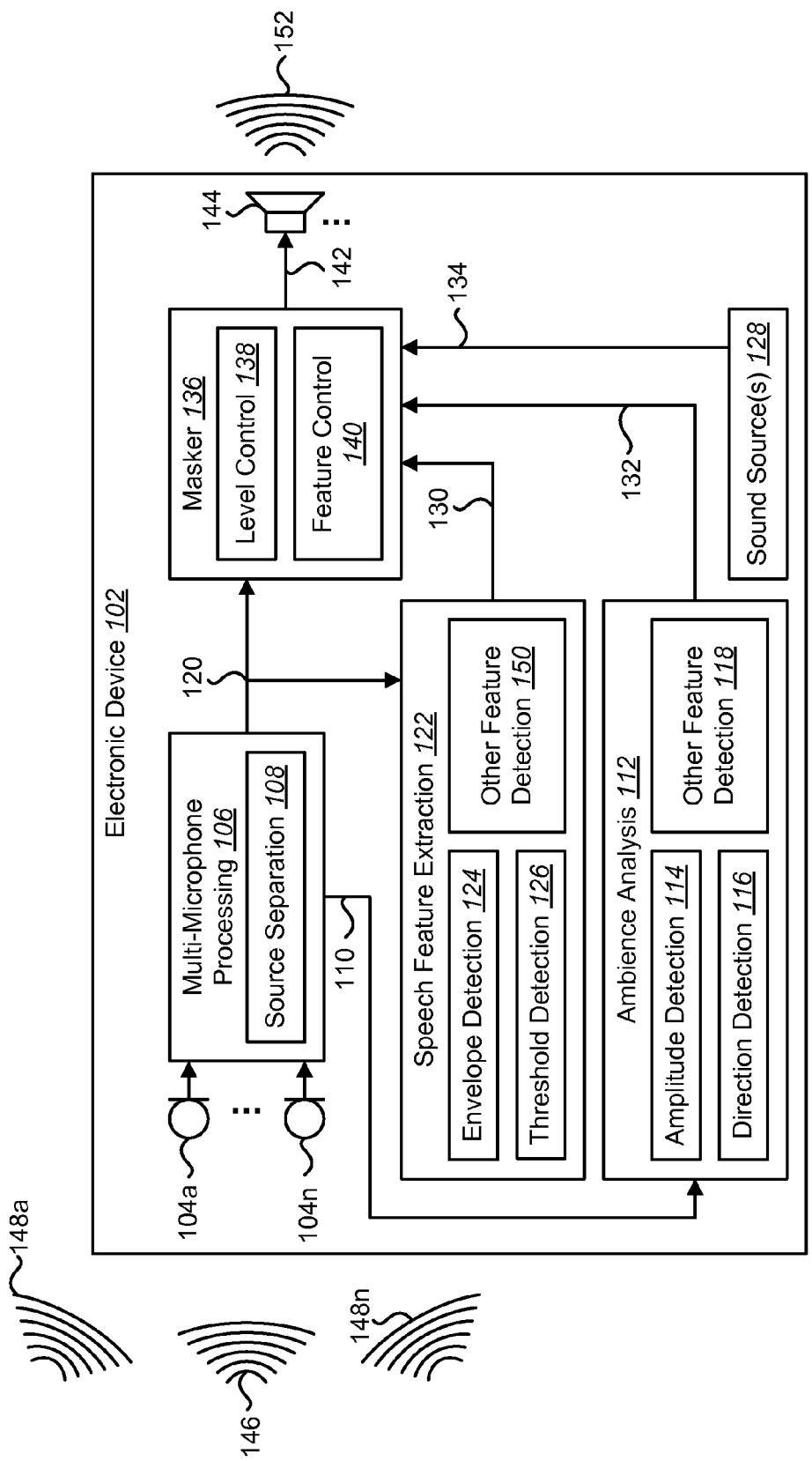
FIG. 1 is a block diagram illustrating one configuration of an electronic device in which systems and methods for generating a masking signal may be implemented.

The systems and methods disclosed herein may be applied to a variety of electronic devices. Examples of electronic devices include voice recorders, video cameras, audio players (e.g., Moving Picture Experts Group-1 (MPEG-1) or MPEG-2 Audio Layer 3 (MP3) players), video players, audio recorders, desktop computers/laptop computers, personal digital assistants (PDAs), gaming systems, etc. One kind of electronic device is a communication device, which may communicate with another device. Examples of communication devices include telephones, laptop computers, desktop computers, cellular phones, smartphones, wireless or wired modems, e-readers, tablet devices, gaming systems, cellular telephone base stations or nodes, access points, wireless gateways and wireless routers.

An electronic device or communication device (e.g., wireless communication device) may operate in accordance with certain industry standards, such as International Telecommunication Union (ITU) standards and/or Institute of Electrical and Electronics Engineers (IEEE) standards (e.g., Wireless Fidelity or "Wi-Fi" standards such as 802.11a, 802.11b, 802.11g, 802.11n and/or 802.11ac). Other examples of standards that a communication device may comply with include IEEE 802.16 (e.g., Worldwide Interoperability for Microwave Access or "WiMAX"), Third Generation Partnership Project (3GPP), 3GPP Long Term Evolution (LTE), Global System for Mobile Telecommunications (GSM) and others (where a communication device may be referred to as a User Equipment (UE), NodeB, evolved NodeB (eNB), mobile device, mobile station, subscriber station, remote station, access terminal, mobile terminal, terminal, user terminal, subscriber unit, etc., for example). While some of the systems and methods disclosed herein may be described in terms of one or more standards, this should not limit the scope of the disclosure, as the systems and methods may be applicable to many systems and/or standards.

It should be noted that some communication devices may communicate wirelessly and/or may communicate using a wired connection or link. For example, some communication devices may communicate with other devices using an Ethernet protocol. The systems and methods disclosed herein may be applied to communication devices that communicate wirelessly and/or that communicate using a wired connection or link. In one configuration, the systems and methods disclosed herein may be applied to a communication device that communicates with another device using a satellite.

There are many instances where an acoustic signal (e.g., a voice, speech or other signal) includes sensitive information. For example, a user may desire to discuss sensitive topics while on a cellular phone call. However, the user may be limited in his ability to discuss such sensitive topics while in a situation where the discussion may be overheard (e.g., in public) and risk disclosure of the sensitive topics.

The systems and methods disclosed herein provide a way to obscure or mask acoustic signals (e.g., voice, speech or other signal) using an electronic device. In one configuration, the electronic device captures a voice or speech signal and extracts one or more features from it. Examples of features include magnitude or amplitude (e.g., amplitude features), frequency (e.g., spectral features), timing (e.g., temporal features) and/or other features (e.g., spatial features). For instance, the electronic device may determine an envelope (e.g., amplitude or loudness envelope) of the voice signal and/or detect whether the voice signal satisfies one or more thresholds. The electronic device may also capture an ambience signal (e.g., background noise or other sounds that are not the voice or speech signal) and extract one or more features from it. The electronic device may control a sound signal based on the one or more extracted voice and/or ambience features. For example, the electronic device may modify an audio or sound signal such as music, pink noise, or some other sound source based on the extracted features to produce a masking signal. In one implementation, the electronic device may directly modulate (e.g., amplitude modulate) the voice signal to produce the masking signal. The electronic device then outputs the masking signal using a speaker (e.g., one or more speakers on a speaker phone, laptop computer, etc.). The voice or speech signal may thus be obscured, making it difficult for eavesdroppers to overhear or understand the content of the voice or speech signal.

The systems and methods disclosed herein may also allow the reduction or cancellation (e.g., approximate removal) of the masking signal. For example, if the voice signal is user speech on a cellular phone, the cellular phone may reduce or cancel out the masking sound from the voice signal before it is transmitted (to another device, for example). The systems and methods disclosed herein may also allow the voice signal to be obscured without being overpowering. For example, the masking signal may be just loud enough to effectively obscure the voice signal without becoming too distracting to the electronic device user or others in the vicinity. For instance, sound masking with ambient noise may be used in an office to enhance privacy. In one example, 40-48 A-weighted decibel (dB(A)) sound maskers may be used in a typical open office to obscure the voice signal without being overpowering. However, the systems and methods disclosed herein may be used in a smaller listening area, and the masker level may be tuned with the voice energy over time.

For clarity, examples of situations in which the systems and methods disclosed herein may be applied are given hereafter. Suppose that a user receives an important business call on a mobile phone while standing in a long airport security-check line. The user's boss expects him to take the call, yet he hesitates because the topic of discussion may be highly sensitive and he does not want others standing nearby to hear the details. If the user leaves the line to take the call in private, he could miss his flight. In some cases, the user might take the call and hope that others do not eavesdrop—a mistake that could be quite costly.

In one configuration, the systems and methods disclosed herein may allow voice calls to be private in any environment, such as in a line at the airport, in a cubical at work or while riding in a cramped elevator. The systems and methods disclosed herein may intelligently and dynamically mask a voice call so that others in the vicinity cannot hear the details. Rather than resorting to hiding in a closet or whispering on the phone, a user may talk in a normal tone of voice and clearly communicate while maintaining privacy in a public setting when the systems and methods disclosed herein are used.

The systems and methods disclosed herein describe a system that may use a user's voice to generate a masking signal. This masking signal may be used to protect the privacy of a user's voice or speech (e.g., phone conversation privacy). The near-end user's voice may be captured by one or more microphones on an electronic device. Furthermore, an ambient signal (e.g., background sounds or noise) may also be captured by one or more microphones. The voice signal may be analyzed with processes like envelope extraction and threshold detection, whose results may be used to control the characteristics of a masking signal. One or more features of the ambient signal may also be extracted and used to control the characteristics of the masking signal. The masking signal may then be reproduced through a loudspeaker on the same electronic device. In the local area around the near-end user, others may hear the user's voice together with the masking sound. The masking signal obscures the details of the user's speech and thus others around the user may find it difficult to understand the content of the user's voice or speech.

In one configuration of the systems and methods disclosed herein, an electronic device may automatically adjust a masking signal volume according to a user's voice or speech and/or according to ambient noise in real-time so that the masking sound is only as loud as needed to effectively obscure the user's voice. In another configuration, the system may additionally or alternatively adjust the pitch of the sound source(s) using a spectral centroid determined based on the voice signal. Furthermore, the system may automatically cancel out the masking signal or sound for a receiver of the voice signal so that another user may hear the user's speech clearly. For example, the masking signal may be used by an echo canceller on the electronic device to remove the masking sound from the user's speech signal. Additionally or alternatively, multiple types of masking sounds may be selected (e.g., "babbling brook", "gentle waves", "whale songs", pop songs, pink noise, etc.) for best performance and personal interest.

The loudspeaker (e.g., a speakerphone speaker) may be included on the same device as the one or more microphones. When the masking signal is reproduced or output, the best accommodating acoustics of the device may be such that the maximum energy is emitted outwards and the near-end user's ear receives reduced or minimum energy from the masker. The system and methods disclosed herein may use, for example, multiple loudspeakers, directional loudspeakers, beam forming techniques and/or device insulation to improve system performance and/or user experience.

The masking signal or sound in open space may not be of interest to a far-end listener and therefore may be removed to maintain proper intelligibility. The masking signal may be reduced or removed from the transmitted signal through the use of an adaptive acoustic echo canceller.

The systems and methods disclosed herein may provide a choice of maskers or masking sounds. For example, a masker may be chosen so that, even if it is not totally masking a voice call by volume, the contents of the voice call should be hardly intelligible to others. On the other hand, the maskers may also be comfortable so that the intelligibility of the far-end user is not compromised, and also so that the near-end user can tolerate the sound during the course of a conversation.

For proof of concept, a personal computer (PC)-based real-time prototype with mock-up microphones and speakers was built. In this configuration, the microphones and speakers were on the same device. The microphones were positioned on the opposite side from and away from the speaker. The microphones and speakers were properly biased and amplified, respectively. Their line level signals were connected to the input and output of the sound card of a laptop computer.

On the laptop, a real-time audio programming software Max/MSP was configured to use the microphone signal and design maskers. In the prototype design, three maskers were experimented with: amplitude modulation of the speech itself, pink noise, and music. The levels of all maskers were smoothly controlled by the envelope of the captured voice from microphone with proper threshold settings (using ramp-up and/or ramp-down times, for example). Though not modeled in this prototype, an echo canceller may be implemented in accordance with the systems and methods disclosed herein. Many parameters in sound level analysis and masker design may be tunable.

With all three maskers in the prototype, once a masker level was proper, a person standing nearby could not understand the content of the conversation easily. Among the maskers, music may provide an appealing experience. For example, the music may not interfere with the near-end talker's conversation, and also functions as a soothing background event. At the same time, music may be very effective at privacy protection, especially when there is a vocal part in the sound track to mask near-end speech.

Maintaining privacy while mobile in high traffic public areas is very important, especially for business professionals, lawyers, etc. who handle highly sensitive information. One way others have approached this issue for on-screen data (e.g., visual data) is to provide a privacy screen filter. One example is the 3M Notebook Privacy Filter. This filter obscures data on a monitor when viewed outside of a 60 degree "Safe Area" directly in front of the monitor. This means that the user can see the data on the screen clearly, but people next to the user cannot. The 3M Notebook Privacy Filter is a successful product and may be useful.

In one configuration, generating a masking signal to prevent a bystander from eavesdropping on a conversation may be implemented as follows. A user may identify a bystander's direction. Each time near-end voice activity is detected, a noise pulse may be emitted in the bystander's direction, thereby masking the near end user's voice. Since the near-end user's earpiece may capture the generated noise pulses as well, some form of active noise control or cancellation (ANC) may be used for in-ear canal noise cancellation as well as receive voice enhancement (RVE) for maintaining far-end received voice intelligibility despite emitted noise shield. For example, RVE may boost different frequency regions of voice to maintain it above a certain noise floor. The noise reference generated to provide near-end noise reduction may be constructed using near-end microphones and/or the noise signals used in the masking signal generation may directly be fed to the noise reduction and RVE blocks/modules. The RVE block/module may be based on a constant signal-to-noise ratio (SNR) or a perceptual model so knowledge of the noise signal may quickly result in an enhanced far-end signal played back at the earpiece for best intelligibility. An echo cancellation (EC) block/module may also take advantage of knowledge of a played-back loudspeaker signal to contribute to the near-end speech enhancement task. The near-end microphone array may also be used to create a robust near-end user voice activity detector. More detail is given below.

In one configuration of the systems and methods disclosed herein, a voice microphone captures speech. The character of the speech may then be analyzed, from which an electronic device derives a control signal to manipulate a masker (e.g., masking signal generator). The masker source signal may be the speech itself, a synthesized signal and/or audio (e.g., a sound signal) from other sources such as media files inside a handset, for example. The sound may then be played through a speaker to interfere with eavesdroppers.

In another configuration, the systems and methods disclosed herein may use multi-microphone capabilities, not only to capture the speech, but also to collect more information about the surroundings. For example, multiple microphones instead of a single microphone may be used at a front end. After multi-microphone processing such as blind source separation, an electronic device may not only obtain a cleaner speech signal, but may also obtain ambience signals (from the residue, for example).

Further analysis may be performed on the ambience signals, such that knowledge may be gained about the loudness, direction and/or other characteristics, etc., about ambient noise. Then, a second control signal may be supplied to the masker (e.g., a masking signal level/characteristic controller) to further adjust the masking signal. In situations where the ambient noise level is high and/or the type of ambience is already a good masker, the masker (e.g., active masking signal generator) may not need to work as hard as when there is only silence in the ambient environment.

For example, compare a user of a handset that is implemented based on the systems and methods disclosed herein using the handset in three different situations. In a first scenario, the user is talking in a library. The environment is very quiet, and all the words the user says may be easily overheard and/or identified. The systems and methods disclosed herein may generate a sufficient masker level so that the privacy in the conversation is safe. In a second scenario, assume that the user is talking on a phone at the New York Stock Exchange. There may be many people around generating a lot of babble noise. Here, the babble noise may be nearly sufficient to obscure the phone conversation, so the masker may work at a much lower level so that any unmasked (by ambient babble noise) conversation may be protected. In a third scenario, assume that the user is talking in a bus or train. In this setting, the environment may produce a lot of low frequency noise, such that the low frequency part of the user speech is already masked. Here, the active masker may only need to cover and protect a higher frequency portion of the user's conversation. Thus, some spectral adjustments may be performed without the masker operating at full blast as in the first scenario.

Various configurations are now described with reference to the Figures, where like element names may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

FIG. 1 is a block diagram illustrating one configuration of an electronic device 102 in which systems and methods for generating a masking signal may be implemented. Examples of the electronic device 102 include audio recorders, telephones, digital cameras, digital camcorders, cellular phones, smartphones, laptop computers, desktop computers, gaming systems, personal digital assistants, music players (e.g., MP3 players), etc. The electronic device 102 may include one or more microphones 104a-n, a multi-microphone processing block/module 106, an ambience analysis block/module 112, a speech feature extraction block/module 122, a masker 136, one or more sound sources 128 and/or one or more speakers 144. As used herein, the term "block/module" may indicate that a particular element (e.g., ambience analysis block/module 112) may be implemented in hardware, software or a combination of both.

The one or more microphones 104a-n may be transducers (e.g., acoustoelectric transducers) used to convert acoustic signals into electrical or electronic signals. For example, the one or more microphones 140a-n may capture an acoustic voice signal 146 and/or one or more acoustic ambient signals 148a-n and convert them into electrical or electronic signals that are provided to the multi-microphone processing block/module 106. For instance, each of the microphones 104a-n may generate an audio signal (e.g., electrical or electronic signal) that represents the acoustic voice signal 146, acoustic ambient signals 148a-n or a mixture of both. In one configuration, multiple audio signals may thus be obtained using multiple microphones 104a-n. Examples of the microphones 104a-n include dynamic microphones, condenser microphones, piezoelectric microphones, fiber optic microphones, laser microphones, etc. In some configurations, all of the one or more microphones 104a-n may be located on the same side of the electronic device 102. In other configurations, one or more of the microphones 104a-n may be located on different sides (e.g., opposite sides) of the electronic device 102 from each other. For example, one or more of the microphones 104a-n may be designated or dedicated to capturing the acoustic voice signal 146, while one or more of the microphones 104a-n may be designated or dedicated to capturing the acoustic ambient signals 148a-n. It should also be noted that one or more of the microphones 104a-n may or may not be located on the same side of the electronic device 102 as one or more of the speaker(s) 144.

The multi-microphone processing block/module 106 may be used to process the audio signals (e.g., electrical or electronic signals) provided by the one or more microphones 104a-n. The multi-microphone processing block/module 106 may include a source separation block/module 108. The source separation block/module 108 may generate (e.g., estimate) a voice signal 120. For example, the source separation block/module 108 may remove an estimated ambience signal (e.g., ambient noise) 110 from the captured audio signal(s) in order to estimate the voice signal 120. The voice signal 120 may be provided to the speech feature extraction block/module 122. The voice signal 120 may optionally be provided to the masker 136. In some configurations, the voice signal 120 may be stored in memory. For example, the electronic device 102 may be a digital voice recorder that may store the voice signal 120 in memory for later retrieval and/or output.

The speech feature extraction block/module 122 may be used to extract one or more features from the voice signal 120. Examples of voice signal 120 features include magnitude or amplitude (e.g., loudness, volume, etc.), spectral (e.g., pitch or frequency), spatial (e.g., directional) and/or temporal (e.g., timing, transitional, phase) features, etc. The speech feature extraction block/module 122 may produce a first control signal 130 based on the one or more features extracted. In one configuration, the speech feature extraction block/module 122 may include an envelope detection block/module 124 and/or threshold detection block/module 126. The envelope detection block/module 124 may determine an envelope signal (e.g., amplitude or loudness envelope) based on the voice signal 120. For example, this envelope signal may indicate the amplitude or loudness (and variations thereof) of the voice signal 120. This amplitude or loudness may be measured or characterized as sound pressure, sound pressure level (e.g., decibels), sound intensity, sound power, sones, phons, volts and/or amperes, etc.

The threshold detection block/module 126 may detect when the envelope signal meets or crosses one or more thresholds. For example, the threshold detection block/module 126 may detect when the envelope signal amplitude increases a given amount or decreases a given amount. In one example, several thresholds may be established in a range of amplitudes. In another example, one threshold may be established that is a certain amount or percentage higher than a reference sample or average of the envelope signal, while another threshold may be established that is a certain amount or percentage below the reference sample or average. The threshold detection block/module 126 may indicate when a threshold is met or crossed and/or which threshold is met or crossed by the envelope signal. This information may be provided to the masker as part of the first control signal 130, for example.

Additionally or alternatively, the speech feature extraction block/module 122 may include an "other feature" detection block/module 150. The other feature detection block/module 150 may detect other features of the voice signal 120. Examples of other features include spectral (e.g., frequency), spatial (e.g., directional) and temporal (e.g., timing, phase, transitional, etc.) characteristics.

The first control signal 130 provided by the speech feature extraction block/module 122 may provide the actual features extracted (e.g., envelope signal, spectral characteristics, spatial characteristics, other characteristics etc.) and/or control information based on the extracted features (e.g., triggers for amplitude or loudness ramping, etc.). The first control signal 130 may be provided to the masker 136.

The ambience analysis block/module 112 may analyze the ambience signal 110 to produce a second control signal 132 that is provided to the masker 136. The ambience analysis block/module 112 may include an amplitude (e.g., loudness) detection block/module 114, a direction detection block/module 116 and/or an other feature detection block/module 118. The amplitude detection block/module 114 may detect or extract an amplitude or loudness of the ambience signal 110. For example, the amplitude or loudness may be measured by detecting an envelope of the ambience signal 110. This amplitude or loudness may be measured or characterized as sound pressure, sound pressure level (e.g., decibels), sound intensity, sound power, sones, phons, volts and/or amperes, etc. In some configurations, the amplitude or loudness of the ambience signal 110 may be measured across a spectrum or range of frequencies. In this way, the ambience signal 110 may be characterized based on the spectral magnitude of the acoustic ambient signals (e.g., sounds or noise) 148a-n received by the electronic device 102, for example.

The direction detection block/module 116 may determine or estimate the direction (and/or other spatial characteristics) of the acoustic ambient signals (e.g., sounds or noise) 148a-n. For example, the direction detection block/module 116 may use phase shifts between audio signals received by multiple microphones 104a-n to determine the direction of a particular acoustic ambient signal 148a-n. The other feature detection block/module 118 may be used to detect other features of the ambience signal 110, such as spectral (e.g., frequency) and/or temporal (e.g., timing, phase, transitional) characteristics.

The second control signal 132 provided by the ambience analysis block/module 112 may provide the actual features analyzed (e.g., amplitude, direction, spectral characteristics, etc.) and/or control information based on the analyzed features (e.g., triggers for amplitude or loudness ramping, etc.). The second control signal 132 may be provided to the masker 136.

The one or more sound sources 128 may provide one or more sound signals 134 to the masker 136. Examples of sound sources 128 include music or sound files (e.g., moving picture experts group (MPEG)-1 or MPEG-2 audio layer 3 (MP3) files, waveform audio file format (WAV) files, musical instrument digital interface (MIDI) files, etc.), synthesized sounds or noise and/or audio inputs or interfaces (for receiving a sound signal 134 from another device, for example), etc. For instance, one sound source 128 may be memory on the electronic device 102 that provides music or sound files, while another sound source 128 may be a port used to receive a sound signal 134 from another device. The one or more sound sources 128 may be optional. For example, the masker 136 may only use the voice signal 120 to generate the masking signal 142. Additionally or alternatively, the masker 136 may use a sound signal 134 provided from one or more sound sources 128 to generate a masking signal 142. In some configurations, the sound source 128 and/or sound signal 134 used may be selected based on an input. For example, the electronic device 102 may receive a user input via a user interface (not illustrated in FIG. 1) that indicates a particular sound source 128 and/or sound signal 134 for use. For instance, the electronic device 102 may receive an input using a keyboard, mouse, touchscreen, microphone 104, button, etc. that indicates a selected sound source 128 and/or sound signal 134.

The masker 136 may be a block/module used to generate a masking signal 142. The masking signal 142 may be output as an acoustic masking signal 152 using one or more speakers 144 (e.g., loudspeakers) in order to obscure or mask the acoustic voice signal 146. The masker 136 may generate the masking signal 142 based on the first control signal 130 and the second control signal 132. As described above, the masking signal 142 may also be based on a sound signal 134 in addition to or alternatively from the voice signal 120. For example, the masking signal 142 may comprise music provided as a sound signal 134 from memory that has been adjusted and/or modified based on the first control signal 130 and the second control signal 132. In another example, the masking signal 142 may comprise the voice signal 120 that has been adjusted and/or modified based on the first control signal 130 and the second control signal 132.

The masker 136 may include, for example, a level control block/module 138 and/or a feature control block/module 140. The level control block/module 138 may adjust the level (e.g., amplitude, magnitude, volume, loudness, etc.) of an input signal (e.g., voice signal 120 and/or sound signal 134) based on the first control signal 130 and/or the second control signal 132. In one example, the masker 136 may amplitude modulate the voice signal 120 based on a speech envelope provided in the first control signal 130.

In another example, the level control 138 may adjust the input signal amplitude or loudness in a direct relationship with a speech envelope (or threshold triggers based on the speech envelope) provided in the first control signal 130. For instance, if the speech envelope increases in amplitude or loudness, the level control 138 may increase (e.g., ramp up) the amplitude or loudness of the input signal. However, if the speech envelope decreases in amplitude or loudness, the level control 138 may decrease (e.g., ramp down) the amplitude or loudness of the input signal. For example, as a user speaks louder or softer, the electronic device 102 may respectively produce a louder or softer acoustic masking signal 152 to effectively obscure the acoustic voice signal 146. This may provide an acoustic masking signal 152 that is loud enough to obscure the acoustic voice signal 146 without being overpowering or annoying.

Additionally or alternatively, the level control block/module 138 may adjust the level (e.g., amplitude, loudness, etc.) of an input signal (e.g., voice signal 120 and/or sound signal 134) based on the second control signal 132. For example, the level control 138 may adjust the input signal amplitude or loudness in an inverse relationship with an ambience amplitude or loudness (or threshold triggers based on the amplitude or loudness) provided in the second control signal 132. For instance, if the ambience signal 110 increases in amplitude or loudness, the level control 138 may decrease (e.g., ramp down) the amplitude or loudness of the input signal. However, if the ambience signal 110 decreases in amplitude or loudness, the level control 138 may increase (e.g., ramp up) the amplitude or loudness of the input signal. For example, as acoustic ambient signals (e.g., sounds or noise) 148a-n become louder or softer, the electronic device 102 may respectively produce a softer or louder acoustic masking signal 152. For instance, if the ambient signals (e.g., sounds or noise) 148a-n are loud enough and/or of the correct characteristics to effectively mask the acoustic voice signal 146, then the electronic device 102 may not need to produce a loud acoustic masking signal 152. Thus, the masker 136 may operate more efficiently, possibly saving power.

The masker 136 may additionally or alternatively include a feature control 140. The feature control 140 may control one or more features of the input signal (e.g., voice signal 120 and/or sound signal 134) based on the first control signal 130 and/or the second control signal 132. For example, the feature control 140 may adjust spectral characteristics of the input signal (e.g., voice signal 120 and/or sound signal 134) based on spectral characteristics of the voice signal 120 and/or the ambience signal 110. For instance, if the second control signal 132 indicates that there is enough low-frequency noise in the acoustic ambient signals (e.g., sounds) 148a-n to effectively obscure a low-frequency portion of the acoustic voice signal 146 but not enough high-frequency noise in the acoustic ambient signals 148a-n to effectively obscure a high-frequency portion, then the feature control 140 may (independently or use the level control 138 to) increase the amplitude or loudness in a high frequency portion of a sound signal 134 in order to produce an acoustic masking signal 152 that effectively masks the high-frequency portion of the acoustic voice signal 146.

In another example, the feature control 140 may adjust the spatial characteristics (e.g., directionality) of the acoustic masking signal 152 based on the first control signal 130 and/or second control signal 132. For instance, the first control signal 130 may indicate the direction of the received acoustic voice signal 146, while the second control signal 132 may indicate one or more directions of acoustic ambient signals (e.g., sounds) 148a-n. The feature control 140 may use this information to adjust the directionality of the acoustic masking signal 152, steering it 152 away from the user (e.g., the source of the acoustic voice signal 146). Additionally or alternatively, the feature control 140 may steer the acoustic masking signal 152 away from strong ambient signals (e.g., sounds) 148a-n that are sufficient to mask the acoustic voice signal 146 and/or potentially towards quiet ambient signals 148a-n and/or in directions without acoustic ambient signals 148a-n. This may help to obscure the acoustic voice signal 146 in directions where it 146 might be more easily overheard, for example.

It should be noted that the one or more speakers 144 may be transducers (e.g., electroacoustic transducers) that convert an electrical or electronic signal (e.g., the masking signal 142) into an acoustic signal (e.g., the acoustic masking signal 152). In one configuration, the one or more speakers 144 may be omnidirectional. In other configurations, the one or more speakers 144 may be directional. For example, an array of speakers 144 may be used in some configurations to direct the acoustic masking signal 152 in a particular direction. In some configurations, one or more speakers 144 may be located on a different side (e.g., opposite side) of the electronic device 102 in relation to one or more microphones 104a-n. In other configurations, one or more of the speakers 144 may be located on the same side of the electronic device 102 as one or more microphones 104a-n.

Figure 2:
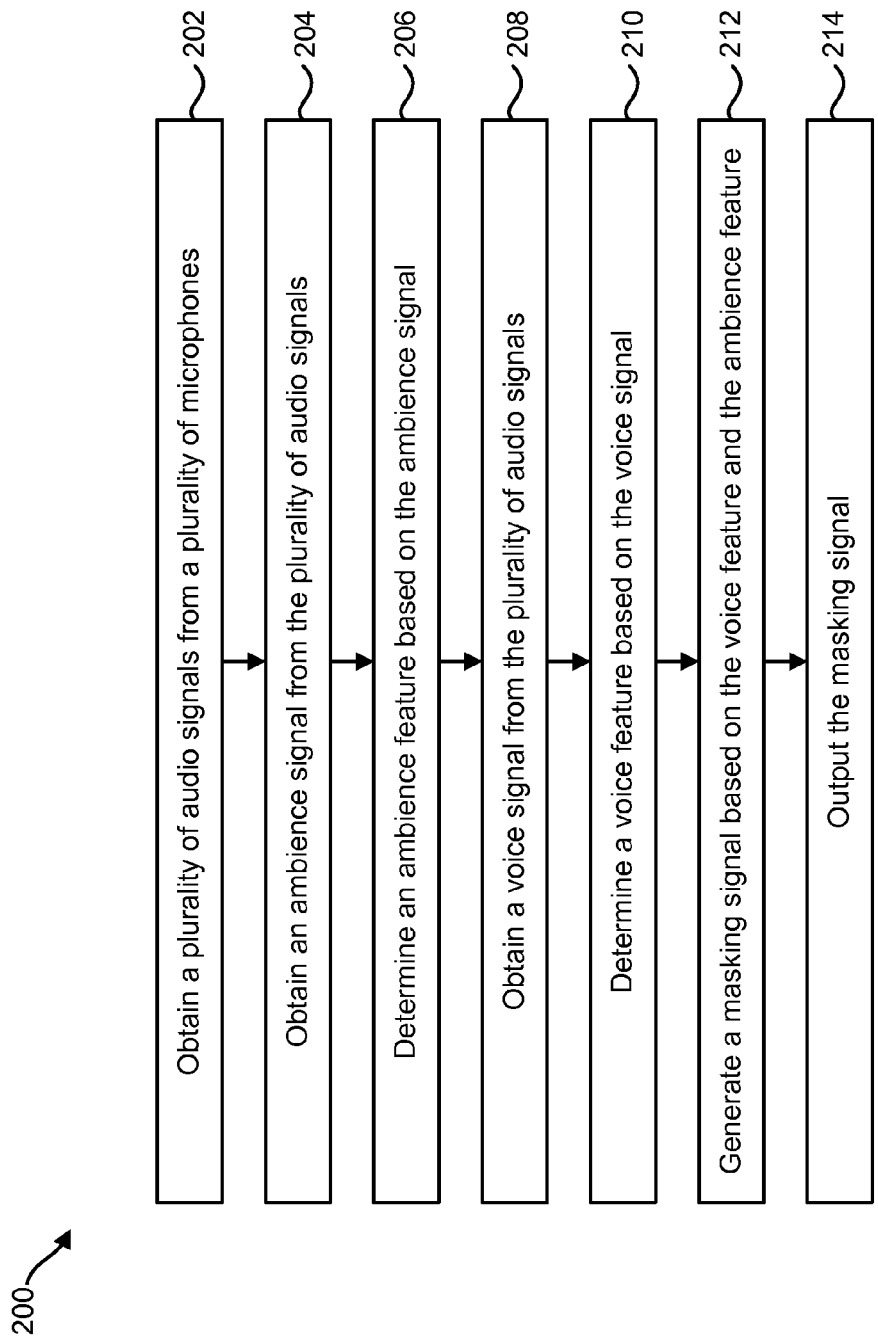
FIG. 2 is a flow diagram illustrating one configuration of a method for generating a masking signal on an electronic device.

FIG. 2 is a flow diagram illustrating one configuration of a method 200 for generating a masking signal 142 on an electronic device 102. The electronic device 102 may obtain 202 a plurality of audio signals from a plurality of microphones 104a-n. For example, the plurality of microphones 104a-n may convert an acoustic voice signal 146 and/or one or more acoustic ambient signals 148a-n into electrical or electronic audio signals.

The electronic device 102 may obtain 204 an ambience signal 110 from the plurality of audio signals. For example, the electronic device 102 may estimate ambient sounds and/or noise in the audio signals. In one configuration, the electronic device 102 may use a voice activity detector to estimate the ambient sounds and/or noise in the audio signals. In this configuration, for example, more dynamic and sporadic audio activities may be classified as voice, while more stationary sounds may be classified as the ambient sounds. In another configuration, a blind source separation (BSS) signal processing mechanism may remove a voice signal from multiple microphone-captured signals, thereby providing a better estimation of ambient sounds.

The electronic device 102 may determine 206 an ambience feature based on the ambience signal 110. Examples of features include amplitude (e.g., magnitude, loudness, etc.) characteristics, spatial characteristics (e.g., direction), spectral characteristics (e.g., pitch, frequency) and/or temporal characteristics, etc. For instance, the electronic device 102 may determine 206 the amplitude (e.g., a loudness envelope) of the ambience signal 110. Additionally or alternatively, the electronic device 102 may determine 206 acoustic ambient signal 148a-n spatial characteristics (e.g., directionality) using observed phase shifts in the audio signals. Additionally or alternatively, the electronic device 102 may determine 206 spectral characteristics (e.g., amplitude or magnitude of the ambience signal 110 over a range of frequencies). In some configurations, the electronic device 102 may generate a second control signal 132 based on the ambience feature.

The electronic device 102 may obtain 208 a voice signal 120 from the plurality of audio signals. For example, the electronic device 102 may separate the voice signal 120 from the audio signals. In one configuration, the electronic device 102 may subtract or remove a noise estimate (e.g., the ambience signal 110) from the audio signals in order to estimate the voice signal 120. One typical robust unmixing example is blind source separation (BSS). For instance, when signal sources are equal to or less than the number of microphones 104a-n, one of the sources (e.g., voice) may be extracted through BSS signal processing.

The electronic device 102 may determine 210 a voice feature based on the voice signal 120. Examples of features include amplitude (e.g., magnitude, loudness, etc.) characteristics, temporal characteristics, spatial characteristics (e.g., direction) and/or spectral characteristics, etc. For instance, the electronic device 102 may determine 210 the amplitude (e.g., a loudness envelope) of the voice signal 120. Additionally or alternatively, the electronic device 102 may determine 210 acoustic voice signal 142 directionality using observed phase shifts in the audio signals. Additionally or alternatively, the electronic device 102 may determine 210 spectral characteristics (e.g., amplitude or magnitude of the voice signal 120 over a range of frequencies). In some configurations, the electronic device 102 may generate a first control signal 130 based on the voice feature.

The electronic device 102 may generate 212 a masking signal 142 based on the voice feature and the ambience feature (e.g., based on the first control signal 130 and the second control signal 132). For example, the electronic device 102 may adjust a signal (e.g., sound signal 134) amplitude, magnitude, loudness or volume based on the voice feature and the ambience feature to generate 212 the masking signal 142. In one configuration, the electronic device 102 adjusts the signal (e.g., sound signal 134) amplitude or loudness in a direct relationship with a voice envelope (e.g., amplitude or loudness envelope) and adjusts the signal amplitude or loudness in an inverse relationship with an ambience amplitude or loudness (e.g., amplitude or loudness envelope). In another configuration, the electronic device 102 may amplitude modulate a signal (e.g., voice signal 120 and/or sound signal 134) based on the voice feature and/or the ambience feature.

In another example, the electronic device 102 may adjust spectral characteristics of a signal (e.g., modulated voice signal 120 and/or sound signal 134) based on voice feature and/or ambience feature. For instance, if the ambience feature indicates that there is enough low-frequency noise in the acoustic ambient signals (e.g., sounds) 148a-n to effectively obscure a low-frequency portion of the acoustic voice signal 146 but not enough high-frequency noise in the acoustic ambient signals 148a-n to effectively obscure a high-frequency portion, then the electronic device 102 may increase the amplitude or loudness in a high-frequency portion of a sound signal 134 in order to produce an acoustic masking signal 152 that effectively masks the high-frequency portion of the acoustic voice signal 146.

In yet another example, the electronic device 102 may adjust the spatial characteristics (e.g., directionality) of a signal (e.g., modulated voice signal 120 and/or sound signal 134) to generate 212 the masking signal 142. For instance, the voice feature may indicate the direction of the received acoustic voice signal 146, while the ambience feature may indicate one or more directions of acoustic ambient signals (e.g., sounds) 148a-n. This information may be used to adjust the directionality of the acoustic masking signal 152, steering it 152 away from the user (e.g., the source of the acoustic voice signal 146). Additionally or alternatively, the acoustic masking signal 152 may be steered away from strong ambient signals (e.g., sounds) 148a-n that are sufficient to mask the acoustic voice signal 146 and/or potentially towards quiet ambient signals 148a-n and/or in directions without acoustic ambient signals 148a-n. This may help to obscure the acoustic voice signal 146 in directions where it 146 might be more easily overheard, for example.

The electronic device 102 may output 214 the masking signal 142. For example, the electronic device 102 may provide the masking signal 142 to one or more speakers 144, which may convert the masking signal 142 into an acoustic masking signal 152.

It should be noted that the method 200 illustrated in FIG. 2 may be performed in real time by the electronic device 102. For example, the audio signals may be obtained 202, the ambience signal 110 may be obtained 204, the ambience feature may be determined 206, the voice signal 120 may be obtained 208, the voice feature may be determined 210 and/or the masking signal 142 may be generated 212 and output 214 in real time. The method 200 may be performed in real time in order to effectively mask the acoustic voice signal 146 with a corresponding acoustic masking signal 152.

Figure 3:
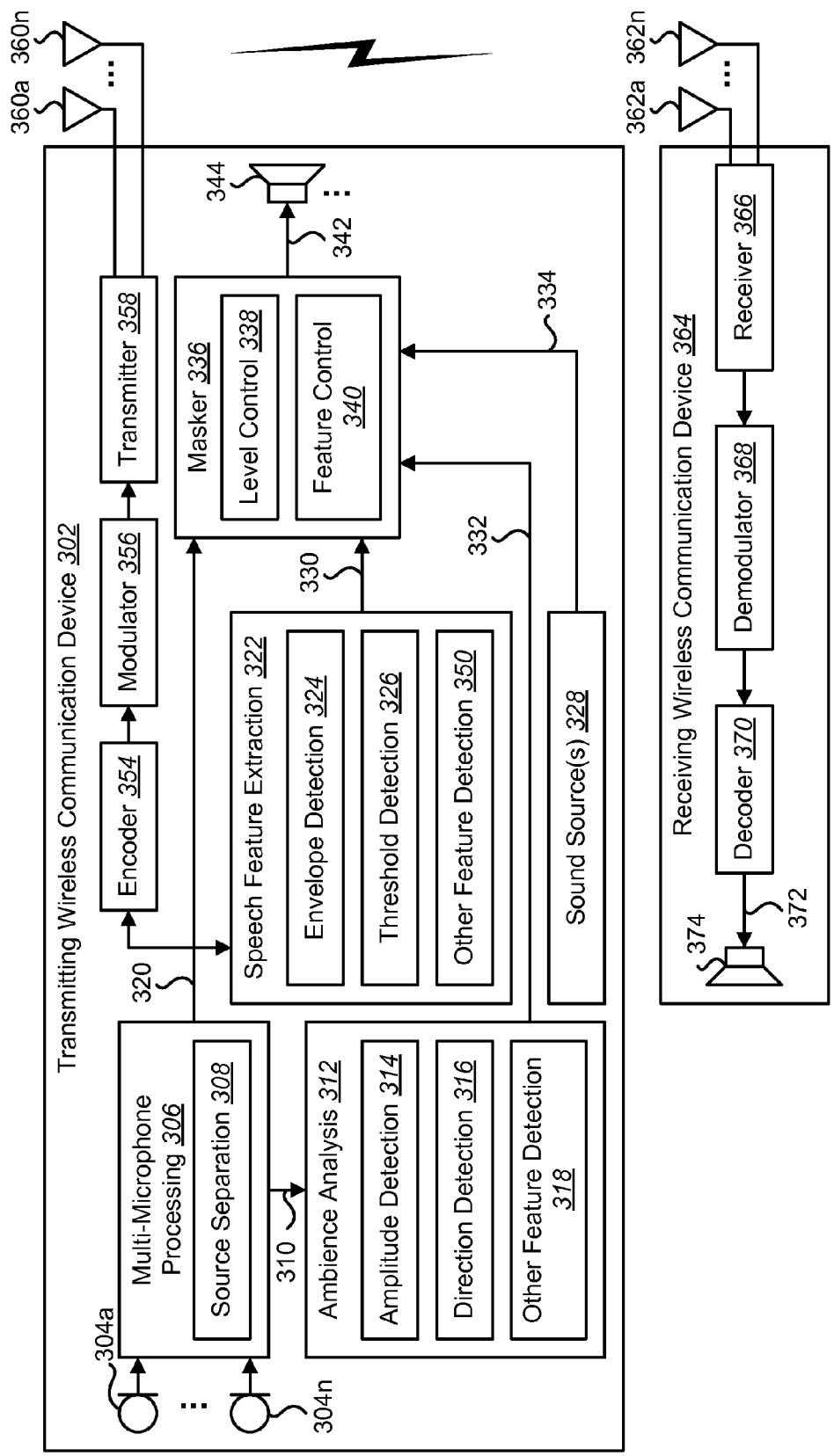
FIG. 3 is a block diagram illustrating one configuration of a transmitting wireless communication device in which systems and methods for generating a masking signal may be implemented.

FIG. 3 is a block diagram illustrating one configuration of a transmitting wireless communication device 302 in which systems and methods for generating a masking signal may be implemented. Examples of the transmitting wireless communication device 302 include cellular phones, smartphones, laptop computers, tablet devices, gaming systems, personal digital assistants, music players (e.g., MP3 players), etc. The transmitting wireless communication device 302 may include one or more microphones 304a-n, a multi-microphone processing block/module 306, an ambience analysis block/module 312, a speech feature extraction block/module 322, a masker 336, one or more sound sources 328, one or more speakers 344, an encoder 354, a modulator 356, a transmitter 358 and/or one or more antennas 360a-n.

The one or more microphones 304a-n may be transducers (e.g., acoustoelectric transducers) used to convert acoustic signals into electrical or electronic signals. For example, the one or more microphones 304a-n may capture an acoustic voice signal and/or one or more acoustic ambient signals and convert them into electrical or electronic signals that are provided to the multi-microphone processing block/module 306. For instance, each of the microphones 304a-n may generate an audio signal (e.g., electrical or electronic signal) that represents the acoustic voice signal, acoustic ambient signals or a mixture of both. In one configuration, multiple audio signals may thus be obtained using multiple microphones 304a-n. Examples of the microphones 304a-n include dynamic microphones, condenser microphones, piezoelectric microphones, fiber optic microphones, laser microphones, etc.

The multi-microphone processing block/module 306 may be used to process the audio signals (e.g., electrical or electronic signals) provided by the one or more microphones 304a-n. The multi-microphone processing block/module 306 may include a source separation block/module 308. The source separation block/module 308 may generate (e.g., estimate) a voice signal 320. For example, the source separation block/module 308 may remove an estimated ambience signal (e.g., ambient noise) 310 from the captured audio signal(s) in order to estimate the voice signal 320. The voice signal 320 may be provided to the speech feature extraction block/module 322. The voice signal 320 may optionally be provided to the masker 336 and/or to the encoder 354.

The speech feature extraction block/module 322 may be used to extract one or more features from the voice signal 320. Examples of voice signal 320 features include magnitude or amplitude (e.g., loudness, volume, etc.), spectral (e.g., pitch or frequency), spatial (e.g., directional) and/or temporal (e.g., phase, timing, etc.) features, etc. The speech feature extraction block/module 322 may produce a first control signal 330 based on the one or more features extracted. In one configuration, the speech feature extraction block/module 322 may include an envelope detection block/module 324 and/or threshold detection block/module 326. The envelope detection block/module 324 may determine an envelope signal (e.g., amplitude or loudness envelope) based on the voice signal 320. For example, this envelope signal may indicate the amplitude or loudness (and variations thereof) of the voice signal 320. This amplitude or loudness may be measured or characterized as sound pressure, sound pressure level (e.g., decibels), sound intensity, sound power, sones, phons, volts and/or amperes, etc.

The threshold detection block/module 326 may detect when the envelope signal meets or crosses one or more thresholds. For example, the threshold detection block/module 326 may detect when the envelope signal increases a given amount or decreases a given amount. In one example, several thresholds may be established in a range of amplitudes. In another example, one threshold may be established that is a certain amount or percentage higher than a reference sample or average of the envelope signal, while another threshold may be established that is a certain amount or percentage below the reference sample or average. The threshold detection block/module 326 may indicate when a threshold is met or crossed and/or which threshold is met or crossed by the envelope signal.

Additionally or alternatively, the speech feature extraction block/module 322 may include an "other feature" detection block/module 350. The other feature detection block/module 350 may detect other features of the voice signal 320. Examples of other features include spectral (e.g., frequency), spatial (e.g., directional) and temporal (e.g., timing, phase, transitional, etc.) characteristics.

The first control signal 330 provided by the speech feature extraction block/module 322 may provide the actual features extracted (e.g., envelope signal, spectral characteristics, etc.) and/or control information based on the extracted features (e.g., triggers for amplitude or loudness ramping, etc.). The first control signal 330 may be provided to the masker 336.

The ambience analysis block/module 312 may analyze the ambience signal 310 to produce a second control signal 332 that is provided to the masker 336. The ambience analysis block/module 312 may include an amplitude (e.g., loudness) detection block/module 314, a direction detection block/module 316 and/or an other feature detection block/module 318. The amplitude detection block/module 314 may detect or extract an amplitude or loudness of the ambience signal 310. For example, the amplitude or loudness may be measured by detecting an envelope of the ambience signal 310. This amplitude or loudness may be measured or characterized as sound pressure, sound pressure level (e.g., decibels), sound intensity, sound power, sones, phons, volts and/or amperes, etc. In some configurations, the amplitude or loudness of the ambience signal 310 may be measured across a spectrum or range of frequencies. In this way, the ambience signal 310 may be characterized based on the spectral magnitude of the acoustic ambient signals (e.g., sounds or noise) received by the transmitting wireless communication device 302, for example.

The direction detection block/module 316 may determine or estimate the direction of the acoustic ambient signals (e.g., sounds or noise). For example, the direction detection block/module 316 may use phase shifts between audio signals received by multiple microphones 304a-n to determine the direction of a particular acoustic ambient signal. The other feature detection block/module 318 may be used to detect other features of the ambience signal 310, such as spectral (e.g., frequency) and/or temporal (e.g., timing, phase, transitional) characteristics.

The second control signal 332 provided by the ambience analysis block/module 312 may provide the actual features analyzed (e.g., amplitude, direction, spectral characteristics, etc.) and/or control information based on the analyzed features (e.g., triggers for amplitude or loudness ramping, etc.). The second control signal 332 may be provided to the masker 336.

The one or more sound sources 328 may provide one or more sound signals 334 to the masker 336. Examples of sound sources 328 include music or sound files (e.g., moving picture experts group (MPEG)-1 or MPEG-2 audio layer 3 (MP3) files, waveform audio file format (WAV) files, musical instrument digital interface (MIDI) files, etc.), synthesized sounds or noise and/or audio inputs or interfaces (for receiving a sound signal 334 from another device, for example), etc. For instance, one sound source 328 may be memory on the transmitting wireless communication device 302 that provides music or sound files, while another sound source 328 may be a port used to receive a sound signal 334 from another device. The one or more sound sources 328 may be optional. For example, the masker 336 may only use the voice signal 320 to generate the masking signal 342. Additionally or alternatively, the masker 336 may use a sound signal 334 provided from one or more sound sources 328 to generate a masking signal 342. In some configurations, the sound source 328 and/or sound signal 334 used may be selected based on an input. For example, the transmitting wireless communication device 302 may receive a user input via a user interface (not illustrated in FIG. 3) that indicates a particular sound source 328 and/or sound signal 334 for use. For instance, the transmitting wireless communication device 302 may receive an input using a keyboard, mouse, touchscreen, microphone 304, button, etc. that indicates a selected sound source 328 and/or sound signal 334.

The masker 336 may be a block/module used to generate a masking signal 342. The masking signal 342 may be output as an acoustic masking signal using one or more speakers 344 (e.g., loudspeakers) in order to obscure or mask the acoustic voice signal. The masker 336 may generate the masking signal 342 based on the first control signal 330 and the second control signal 332. As described above, the masking signal 342 may also be based on a sound signal 334 in addition to or alternatively from the voice signal 320. For example, the masking signal 342 may comprise music provided as a sound signal 334 from memory that has been adjusted and/or modified based on the first control signal 330 and the second control signal 332. In another example, the masking signal 342 may comprise the voice signal 320 that has been adjusted (e.g., amplitude modulated) based on the first control signal 330 and the second control signal 332.

The masker 336 may include, for example, a level control block/module 338 and/or a feature control block/module 340. The level control block/module 338 may adjust the level (e.g., amplitude, magnitude, volume, loudness, etc.) of an input signal (e.g., voice signal 320 and/or sound signal 334) based on the first control signal 330 and/or the second control signal 332.

For example, the level control 338 may adjust the input signal amplitude or loudness in a direct relationship with a speech envelope (or threshold triggers based on the speech envelope) provided in the first control signal 330. For instance, if the speech envelope increases in amplitude or loudness, the level control 338 may increase (e.g., ramp up) the amplitude or loudness of the input signal. However, if the speech envelope decreases in amplitude or loudness, the level control 338 may decrease (e.g., ramp down) the amplitude or loudness of the input signal. For example, as a user speaks louder or softer, the transmitting wireless communication device 302 may respectively produce a louder or softer acoustic masking signal to effectively obscure the acoustic voice signal. This may provide an acoustic masking signal that is loud enough to obscure the acoustic voice signal without being overpowering or annoying.

Additionally or alternatively, the level control block/module 338 may adjust the level (e.g., amplitude, loudness, etc.) of an input signal (e.g., voice signal 320 and/or sound signal 334) based on the second control signal 332. For example, the level control 338 may adjust the input signal amplitude or loudness in an inverse relationship with an ambience amplitude or loudness (or threshold triggers based on the amplitude or loudness) provided in the second control signal 332. For instance, if the ambience signal 310 increases in amplitude or loudness, the level control 338 may decrease (e.g., ramp down) the amplitude or loudness of the input signal. However, if the ambience signal 310 decreases in amplitude or loudness, the level control 338 may increase (e.g., ramp up) the amplitude or loudness of the input signal. For example, as acoustic ambient signals (e.g., sounds or noise) become louder or softer, the transmitting wireless communication device 302 may respectively produce a softer or louder acoustic masking signal. For instance, if the ambient signals (e.g., sounds or noise) are loud enough and/or of the correct characteristics to effectively mask the acoustic voice signal, then the transmitting wireless communication device 302 may not need to produce a loud acoustic masking signal. Thus, the masker 336 may operate more efficiently, possibly saving battery power.

The masker 336 may additionally or alternatively include a feature control 340. The feature control 340 may control one or more features of the input signal (e.g., voice signal 320 and/or sound signal 334) based on the first control signal 330 and/or the second control signal 332. For example, the feature control 340 may adjust spectral characteristics of the input signal (e.g., voice signal 320 and/or sound signal 334) based on spectral characteristics of the voice signal 320 and/or the ambience signal 310. For instance, if the second control signal 332 indicates that there is enough low-frequency noise in the acoustic ambient signals (e.g., sounds) to effectively obscure a low-frequency portion of the acoustic voice signal but not enough high-frequency noise in the acoustic ambient signals to effectively obscure a high-frequency portion, then the feature control 340 may (independently or use the level control 338 to) increase the amplitude or loudness in a high frequency portion of a sound signal 334 in order to produce an acoustic masking signal that effectively masks the high-frequency portion of the acoustic voice signal.

In another example, the feature control 340 may adjust the directionality of the acoustic masking signal based on the first control signal 330 and/or second control signal 332. For instance, the first control signal 330 may indicate the direction of the received acoustic voice signal, while the second control signal 332 may indicate one or more directions of acoustic ambient signals (e.g., sounds). The feature control 340 may use this information to adjust the directionality of the acoustic masking signal, steering it away from the user (e.g., the source of the acoustic voice signal). Additionally or alternatively, the feature control 340 may steer the acoustic masking signal away from strong ambient signals (e.g., sounds) that are sufficient to mask the acoustic voice signal and/or potentially towards quiet ambient signals and/or in directions without acoustic ambient signals. This may help to obscure the acoustic voice signal in directions where it might be more easily overheard, for example.

It should be noted that the one or more speakers 344 may be transducers (e.g., electroacoustic transducers) that convert an electrical or electronic signal (e.g., the masking signal 342) into an acoustic signal (e.g., the acoustic masking signal). In one configuration, the one or more speakers 344 may be omnidirectional. In other configurations, the one or more speakers 344 may be directional. For example, an array of speakers 344 may be used in some configurations to direct the acoustic masking signal in a particular direction.

The voice signal 320 may be provided to the encoder 354. The encoder 354 may encode the voice signal 320 to produce an encoded voice signal. In some configurations, the encoder 354 may also add error detection and/or correction coding to the encoded voice signal. The encoded voice signal may be provided to a modulator 356. The modulator 356 modulates the encoded voice signal into a particular constellation based on the type of modulation used. Some examples of modulation include quadrature amplitude modulation (QAM), phase shift keying (PSK) modulation, etc. The encoded and modulated voice signal may be provided to a transmitter 358. The transmitter 358 may perform further operations on the encoded and modulated voice signal, such as providing amplification in preparation for transmission. The transmitter 358 may transmit the encoded and modulated voice signal as one or more electromagnetic signals using one or more antennas 360a-n.

It should be noted that the transmitting wireless communication device 302 may perform additional or alternative operations on the voice signal 320. For example, the transmitting wireless communication device 302 may map voice signal 320 data to one or more frequencies (e.g., orthogonal frequency division multiplexing (OFDM) subcarriers), time slots, spatial channels, etc.

The one or more electromagnetic signals transmitted from the one or more transmitting wireless communication device 302 antennas 360a-n may be received by a receiving wireless communication device 364. Examples of the receiving wireless communication device 364 include cellular phones, smartphones, laptop computers, tablet devices, gaming systems, personal digital assistants, music players (e.g., MP3 players), etc. In one configuration, the receiving wireless communication device 364 may include one or more speakers 374, a decoder 370, a demodulator 368, a receiver 366 and/or one or more antennas 362a-n. The receiver 366 may receive the one or more transmitted electromagnetic signals using the one or more antennas 362a-n. The received signal may be provided to a demodulator 368. The demodulator 368 demodulates the received signal to produce an encoded signal, which is provided to the decoder 370. The decoder 370 decodes the encoded signal to produce a decoded voice signal 372. The decoded voice signal 372 may be provided to the one or more speakers 374, which may output the decoded voice signal 372 as an acoustic signal.

In some configurations, the electromagnetic signals transmitted from the transmitting wireless communication device 302 to the receiving wireless communication device 364 may be relayed by one or more devices. For example, the transmitting communication device 302 may transmit the electromagnetic signals to a base station, which may receive the signals and provide them to one or more network devices. The signals may be routed to another base station, where they may be relayed or retransmitted to the receiving wireless communication device 364.

Figure 4:
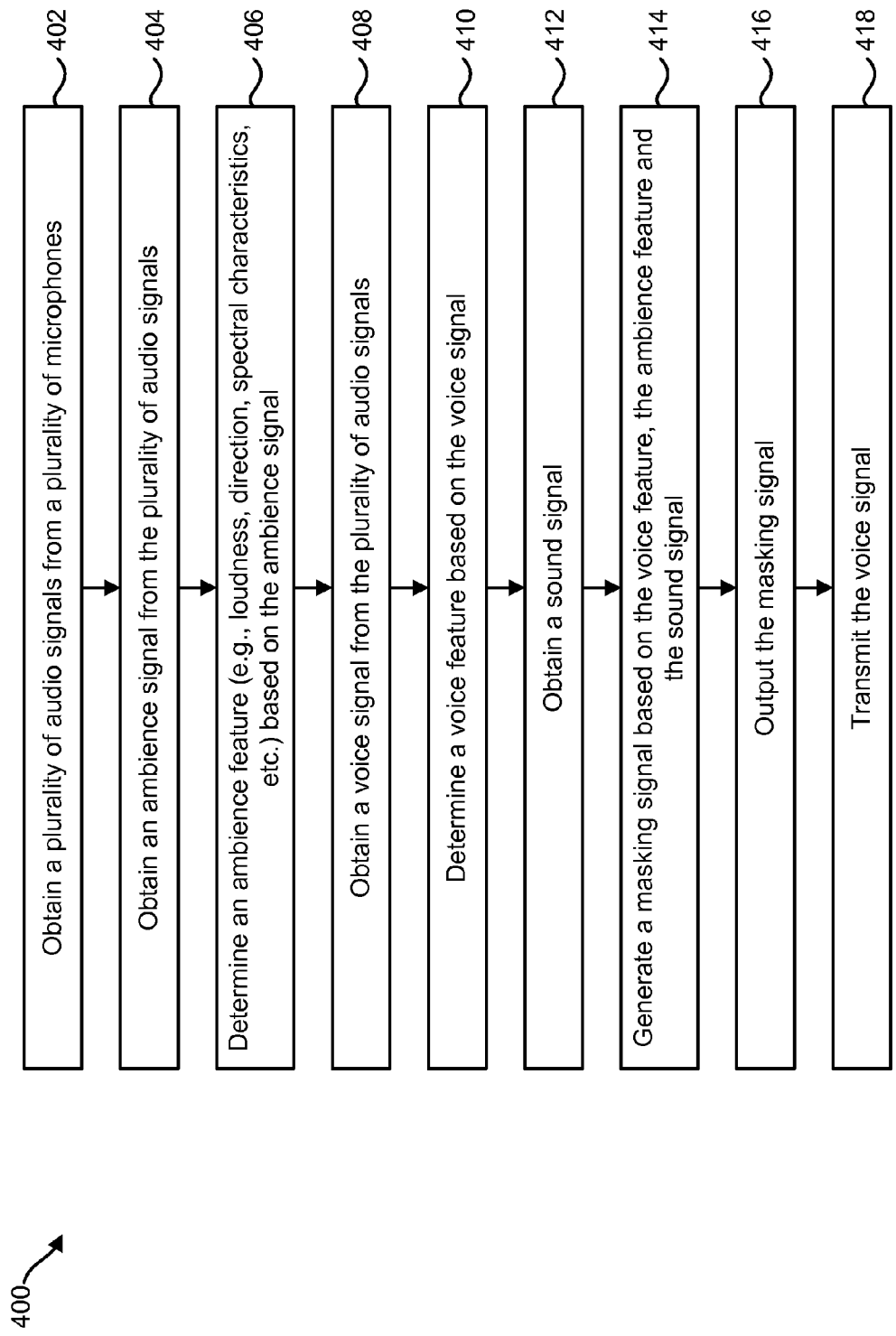
FIG. 4 is a flow diagram illustrating a configuration of a method for generating a masking signal on a transmitting wireless communication device.

FIG. 4 is a flow diagram illustrating a configuration of a method 400 for generating a masking signal 342 on a transmitting wireless communication device 302. The transmitting wireless communication device 302 may obtain 402 a plurality of audio signals from a plurality of microphones 304a-n. For example, the plurality of microphones 304a-n may convert an acoustic voice signal and/or one or more acoustic ambient signals into electrical or electronic audio signals.

The transmitting wireless communication device 302 may obtain 404 an ambience signal 310 from the plurality of audio signals. For example, the transmitting wireless communication device 302 may estimate ambient sounds and/or noise in the audio signals. In one configuration, the transmitting wireless communication device 302 may use a voice activity detector to estimate the ambient sounds and/or noise in the audio signals. In this configuration, for example, more dynamic and sporadic audio activities may be classified as voice, while more stationary sounds may be classified as the ambient sounds. In another configuration, a blind source separation (BSS) signal processing mechanism may remove a voice signal from multiple microphone-captured signals, thereby providing a better estimation of ambient sounds.

The transmitting wireless communication device 302 may determine 406 an ambience feature based on the ambience signal 310. Examples of features include amplitude (e.g., magnitude, loudness, etc.), spatial characteristics (e.g., direction), spectral characteristics, etc. For instance, the transmitting wireless communication device 302 may determine 406 the amplitude (e.g., a loudness envelope) of the ambience signal 310. Additionally or alternatively, the transmitting wireless communication device 302 may determine 406 acoustic ambient signal spatial characteristics (e.g., directionality) using observed phase shifts in the audio signals. Additionally or alternatively, the transmitting wireless communication device 302 may determine 406 spectral characteristics (e.g., amplitude or magnitude of the ambience signal 310 over a range of frequencies). In some configurations, the transmitting wireless communication device 302 may generate a second control signal 332 based on the ambience feature.

The transmitting wireless communication device 302 may obtain 408 a voice signal 320 from the plurality of audio signals. For example, the transmitting wireless communication device 302 may separate the voice signal 320 from the audio signals. In one configuration, the transmitting wireless communication device 302 may subtract or remove a noise estimate (e.g., the ambience signal 310) from the audio signals in order to estimate the voice signal 320. One typical robust unmixing example may be blind source separation (BSS). For instance, when signal sources are equal to or less than the number of microphones 304a-n, one of the sources (e.g., voice) may be extracted through BSS signal processing.

The transmitting wireless communication device 302 may determine 410 a voice feature based on the voice signal 320. Examples of features include amplitude (e.g., magnitude, loudness, etc.), temporal characteristics, spatial characteristics (e.g., direction), spectral characteristics, etc. For instance, the transmitting wireless communication device 302 may determine 410 the amplitude (e.g., a loudness envelope) of the voice signal 320. Additionally or alternatively, the transmitting wireless communication device 302 may determine 410 acoustic voice signal 342 directionality using observed phase shifts in the audio signals. Additionally or alternatively, the transmitting wireless communication device 302 may determine 410 spectral characteristics (e.g., amplitude or magnitude of the voice signal 320 over a range of frequencies). In some configurations, the transmitting wireless communication device 302 may generate a first control signal 330 based on the voice feature.

The transmitting wireless communication device 302 may obtain 412 a sound signal 334. For example, the transmitting wireless communication device 302 may obtain 412 music or sound files (e.g., MP3 files, WAV files, MIDI files, etc.), synthesized sounds or noise and/or an audio input (from another device, for example), etc. In one configuration, the transmitting wireless communication device 302 retrieves a sound signal 334 from memory. Additionally or alternatively, the transmitting wireless communication device 302 may synthesize sounds or noise using an algorithm and/or stored data. Additionally or alternatively, the transmitting wireless communication device 302 retrieves a sound signal 334 from a removable memory device, such as a secure digital (SD) card, universal serial bus (USB) thumb drive, etc., or receives a sound signal 334 (e.g., stream) from another device.

The transmitting wireless communication device 302 may generate 414 a masking signal 342 based on the voice feature (e.g., the first control signal 330), the ambience feature (e.g., the second control signal 332) and the sound signal 334. For example, the transmitting wireless communication device 302 may adjust the sound signal 334 amplitude, magnitude, loudness or volume based on the voice feature and the ambience feature to generate 414 the masking signal 342. In one configuration, the transmitting wireless communication device 302 adjusts the sound signal 334 amplitude or loudness in a direct relationship with a voice envelope (e.g., amplitude or loudness envelope) and adjusts the signal amplitude or loudness in an inverse relationship with an ambience amplitude or loudness (e.g., amplitude or loudness envelope).

In another example, the transmitting wireless communication device 302 may adjust spectral characteristics of the sound signal 334 based on voice feature and/or ambience feature. For instance, if the ambience feature indicates that there is enough low-frequency noise in the acoustic ambient signals (e.g., sounds) to effectively obscure a low-frequency portion of the acoustic voice signal but not enough high-frequency noise in the acoustic ambient signals to effectively obscure a high-frequency portion, then the transmitting wireless communication device 302 may increase the amplitude or loudness in a high-frequency portion of the sound signal 334 in order to produce an acoustic masking signal that effectively masks the high-frequency portion of the acoustic voice signal.

In yet another example, the transmitting wireless communication device 302 may adjust the spatial characteristics (e.g., directionality) of the sound signal 334 to generate 414 the masking signal 342. For instance, the voice feature may indicate the direction of the received acoustic voice signal, while the ambience feature may indicate one or more directions of acoustic ambient signals (e.g., sounds). This information may be used to adjust the directionality of the acoustic masking signal, steering it away from the user (e.g., the source of the acoustic voice signal). Additionally or alternatively, the acoustic masking signal may be steered away from strong ambient signals (e.g., sounds) that are sufficient to mask the acoustic voice signal and/or potentially towards quiet ambient signals and/or in directions without acoustic ambient signals. This may help to obscure the acoustic voice signal in directions where it might be more easily overheard, for example.

The transmitting wireless communication device 302 may output 416 the masking signal 342. For example, the transmitting wireless communication device 302 may provide the masking signal 342 to one or more speakers 344, which may convert the masking signal 342 into an acoustic masking signal.

The transmitting wireless communication device 302 may transmit 418 the voice signal 320. For example, the transmitting wireless communication device 302 may encode, modulate, amplify and/or transmit 418 the voice signal 320. The voice signal 320 may be transmitted as one or more electromagnetic signals using one or more antennas 360a-n. Before transmission, the transmitting wireless communication device 302 may additionally or alternatively map the voice signal 320 data to one or more spatial streams, antennas, frequencies (e.g., subcarriers), time slots, etc.

It should be noted that the method 400 illustrated in FIG. 4 may be performed in real time by the transmitting wireless communication device 302. For example, the audio signals may be obtained 402, the ambience signal 310 may be obtained 404, the ambience feature may be determined 406, the voice signal 320 may be obtained 408, the voice feature may be determined 410, the sound signal 334 may be obtained 412 and/or the masking signal 342 may be generated 414 and output 416 in real time. The method 400 may be performed in real time in order to effectively mask the acoustic voice signal 346 with a corresponding acoustic masking signal 352.

Figure 5:
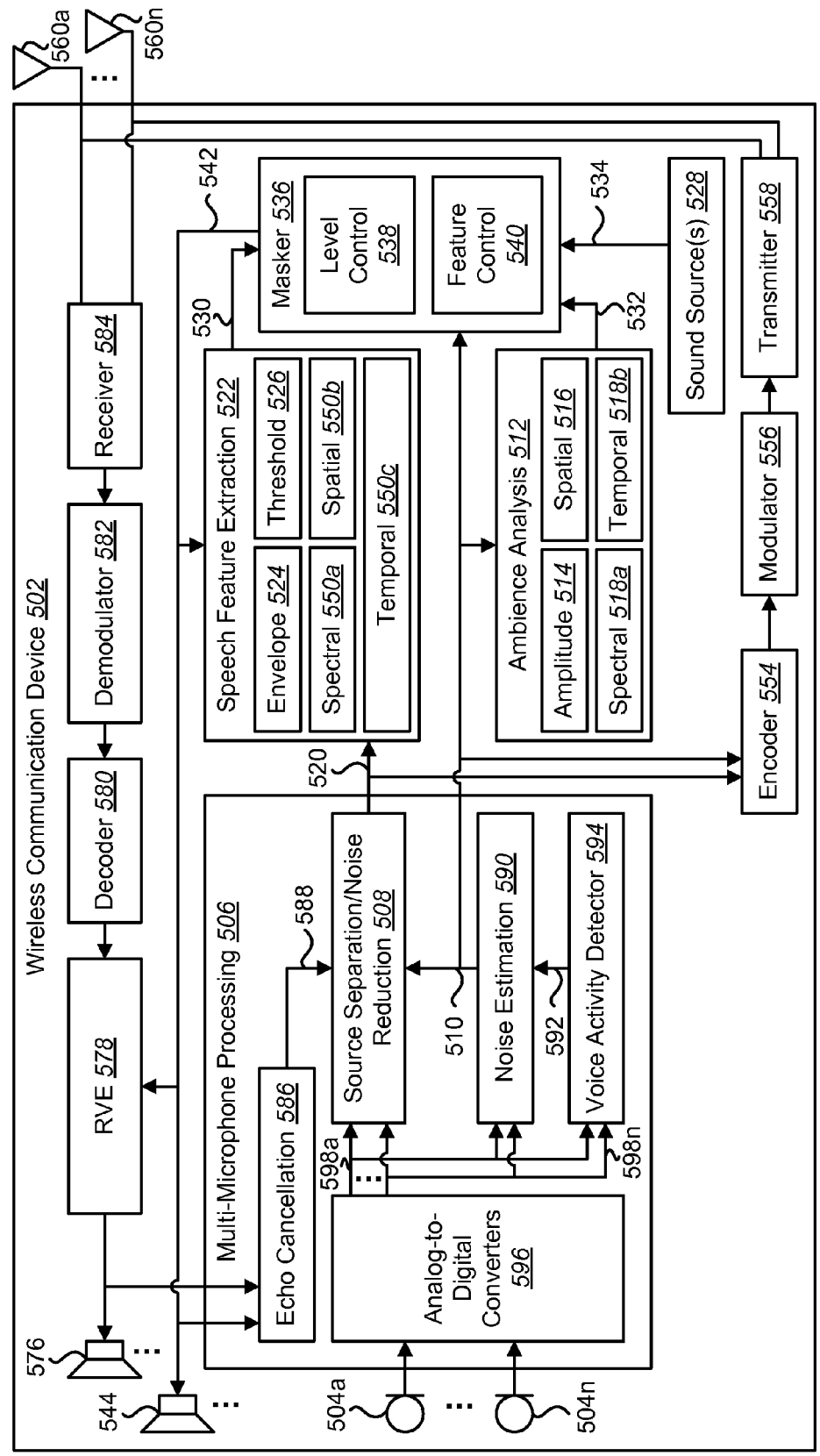
FIG. 5 is a block diagram illustrating one configuration of a wireless communication device in which systems and methods for generating a masking signal may be implemented.

FIG. 5 is a block diagram illustrating one configuration of a wireless communication device 502 in which systems and methods for generating a masking signal may be implemented. Examples of the wireless communication device 502 include cellular phones, smartphones, laptop computers, tablet devices, gaming systems, personal digital assistants, music players (e.g., MP3 players), etc. The wireless communication device 502 may include one or more microphones 504a-n, a multi-microphone processing block/module 506, an ambience analysis block/module 512, a speech feature extraction block/module 522, a masker 536, one or more sound sources 528, one or more speakers 544, one or more earpiece speakers 576, an RVE block/module 578, a decoder 580, a demodulator 582, a receiver 584, an encoder 554, a modulator 556, a transmitter 558 and/or one or more antennas 560a-n.

The one or more microphones 504a-n may be transducers (e.g., acoustoelectric transducers) used to convert acoustic signals into electrical or electronic signals. For example, the one or more microphones 504a-n may capture an acoustic voice signal and/or one or more acoustic ambient signals and convert them into electrical or electronic signals that are provided to the multi-microphone processing block/module 506. For instance, each of the microphones 504a-n may generate an audio signal (e.g., electrical or electronic signal) that represents the acoustic voice signal, acoustic ambient signals or a mixture of both. In one configuration, multiple audio signals may thus be obtained using multiple microphones 504a-n. Examples of the microphones 504a-n include dynamic microphones, condenser microphones, piezoelectric microphones, fiber optic microphones, laser microphones, etc.

The multi-microphone processing block/module 506 may be used to process the audio signals (e.g., electrical or electronic signals) provided by the one or more microphones 504a-n. The multi-microphone processing block/module 506 may include an echo cancellation block/module 586, one or more analog-to-digital converters (ADCs) 596, a source separation and/or noise reduction block/module 508, a noise estimation block/module 590 and/or a voice activity detector 594. The one or more analog-to-digital converters 596 may convert the one or more analog audio signals (captured by the one or more microphones 504a-n) to one or more digital audio signals 598a-n. The one or more digital audio signals 598a-n may be provided to the voice activity detector 594, the noise estimation block/module 590 and/or the source separation/noise reduction block/module 508.

The voice activity detector 594 may detect when voice activity is present in the digital audio signal(s) 598a-n. For example, the voice activity detector 594 may determine when voice or speech is present in the digital audio signal(s) 598a-n as opposed to silence and/or noise, etc. The voice activity detector 594 may provide a voice activity indicator 592 to the noise estimation block/module 590 that indicates when voice activity is present in the digital audio signal(s) 598a-n.

The noise estimation block/module 590 may estimate an ambience signal (e.g., ambient noise) 510 based on the digital audio signal(s) 598a-n and the voice activity indicator 592. For example, the noise estimation block/module 590 may estimate stationary and non-stationary ambient or background noise that is present in the digital audio signal(s) 598a-n. In one configuration, for instance, the noise estimation block/module 590 may estimate a noise floor based on periods in the digital audio signal(s) 598a-n where the voice activity indicator 592 does not indicate voice activity. Thus, the noise estimation block/module 590 may estimate an ambience signal 510. The ambience signal 510 may be provided to the source separation/noise reduction block/module 508 and the ambience analysis block/module 512.

The echo cancellation block/module 586 may be used to reduce or cancel echo in the digital audio signal(s) 598a-n from one or more signals that may be output by the wireless communication device 502. For example, the wireless communication device 502 may output one or more acoustic signals from the one or more earpiece speakers 576 and/or from the one or more speakers (e.g., loudspeakers) 544. As described above, for instance, the wireless communication device 502 may output an acoustic masking signal from the one or more speakers 544 based on a masking signal 542. Additionally or alternatively, the wireless communication device 502 may output other acoustic signals (e.g., voice signals, music, etc.) from the earpiece speaker(s) 576. For example, a user may be using the wireless communication device 502 to make a phone call. During the phone call, the wireless communication device 502 may output voice or speech from the one or more earpiece speakers 576 in addition to or alternatively from an acoustic masking signal output from the one or more speakers 544. The echo cancellation block/module 586 may use one or more received signals (that are also provided to the earpiece speaker(s) 576) and the masking signal 542 to produce an echo signal 588 that may be provided to the source separation/noise reduction block/module 508.

The source separation block/module 508 may generate (e.g., estimate) a voice signal 520. For example, the source separation block/module 508 may remove an estimated ambience signal (e.g., ambient noise) 510 and/or an echo signal 588 from the digital audio signal(s) 598a in order to estimate the voice signal 520. The voice signal 520 may be provided to the speech feature extraction block/module 522. The voice signal 520 may additionally or alternatively be provided to the masker 536 and/or the encoder 554.

The speech feature extraction block/module 522 may be used to extract one or more features from the voice signal 520. Examples of voice signal 520 features include magnitude or amplitude (e.g., loudness, volume, etc.), spectral (e.g., pitch or frequency), spatial (e.g., directional) and/or temporal (e.g., phase) features, etc. The speech feature extraction block/module 522 may produce a first control signal 530 based on the one or more features extracted. In one configuration, the speech feature extraction block/module 522 may include an envelope detection block/module 524 (abbreviated as "Envelope 524" for convenience in FIG. 5) and/or threshold detection block/module 526 (abbreviated as "Threshold 526" for convenience in FIG. 5). The envelope detection block/module 524 may determine an envelope signal (e.g., amplitude or loudness envelope) based on the voice signal 520. For example, this envelope signal may indicate the amplitude or loudness (and variations thereof) of the voice signal 520. This amplitude or loudness may be measured or characterized as sound pressure, sound pressure level (e.g., decibels), sound intensity, sound power, sones, phons, volts and/or amperes, etc.

The threshold detection block/module 526 may detect when the envelope signal meets or crosses one or more thresholds. For example, the threshold detection block/module 526 may detect when the envelope signal increases a given amount or decreases a given amount. In one example, several thresholds may be established in a range of amplitudes. In another example, one threshold may be established that is a certain amount or percentage higher than a reference sample or average of the envelope signal, while another threshold may be established that is a certain amount or percentage below the reference sample or average. The threshold detection block/module 526 may indicate when a threshold is met or crossed and/or which threshold is met or crossed by the envelope signal.

Additionally or alternatively, the speech feature extraction block/module 522 may include one or more other feature detection blocks/modules 550. The other feature detection block(s)/module(s) 550 may detect other features of the voice signal 520. For example, the speech feature extraction block/module may include a spectral detection block/module 550a (abbreviated as "Spectral 550a" for convenience in FIG. 5), a spatial detection block/module 550b (abbreviated as "Spatial 550b" for convenience in FIG. 5) and/or a temporal detection block/module 550c (abbreviated as "Temporal 550c" for convenience in FIG. 5). For instance, these blocks/modules 550a-c may be used to detect and/or extract spectral (e.g., frequency), spatial (e.g., directional) and/or temporal (e.g., timing, phase, transitional, etc.) features or characteristics of the voice signal 520. More specifically, the spectral detection block/module 550a may detect and/or extract spectral (e.g., pitch, frequency, etc.) features of the voice signal 520. For instance, the spectral detection block/module 550a may determine a spectral amplitude or magnitude of the voice signal 520. Additionally or alternatively, the spatial detection block/module 550b may detect and/or extract spatial (e.g., directional) features of the voice signal 520. For example, the spatial detection block/module 550b may determine a direction of received acoustic voice relative to the wireless communication device 502 (e.g., relative to the one or more microphones 504a-n). Additionally or alternatively, the temporal detection block/module 550c may detect and/or extract temporal (e.g., timing, phase) features of the voice signal 520. For example, the temporal detection block/module 550c may determine when speech occurs in the voice signal 520, how long phrases and/or pauses in speech tend to occur, etc.

The first control signal 530 provided by the speech feature extraction block/module 522 may provide the actual features extracted (e.g., envelope signal, spectral, spatial, temporal characteristics, etc.) and/or control information based on the extracted features (e.g., triggers for amplitude or loudness ramping, etc.). The first control signal 530 may be provided to the masker 536.

The ambience analysis block/module 512 may analyze the ambience signal 510 to produce a second control signal 532 that is provided to the masker 536. The ambience analysis block/module 512 may include an amplitude (e.g., loudness) detection block/module 514 (abbreviated as "Amplitude 514" in FIG. 5 for convenience), a spatial (e.g., directional) detection block/module 516 (abbreviated as "Spatial 516" in FIG. 5 for convenience), a spectral detection block/module 518a (abbreviated as "Spectral 518a" in FIG. 5 for convenience) and/or a temporal detection block/module 518b (abbreviated as "Temporal 518b" in FIG. 5 for convenience). The amplitude detection block/module 514 may detect or extract an amplitude or loudness of the ambience signal 510. For example, the amplitude or loudness may be measured by detecting an envelope of the ambience signal 510. This amplitude or loudness may be measured or characterized as sound pressure, sound pressure level (e.g., decibels), sound intensity, sound power, sones, phons, volts and/or amperes, etc. In some configurations, the amplitude or loudness of the ambience signal 510 may be measured across a spectrum or range of frequencies. In this way, the ambience signal 510 may be characterized based on the spectral magnitude of the acoustic ambient signals (e.g., sounds or noise) received by the wireless communication device 502, for example.

The spatial (e.g., direction) detection block/module 516 may determine or estimate spatial features or characteristics of acoustic ambient signals (e.g., sounds or noise). For example, the spatial detection block/module 516 may use phase shifts between audio signals received by multiple microphones 504a-n to determine the direction of a particular acoustic ambient signal. More specifically, the spatial detection block/module 516 may determine a direction of received acoustic ambient signals relative to the wireless communication device 502 (e.g., relative to the one or more microphones 504a-n).

The spectral detection block/module 518a may detect and/or extract spectral (e.g., pitch, frequency, etc.) features of the ambience signal 510. For instance, the spectral detection block/module 518a may determine a spectral amplitude or magnitude of the ambience signal 510. Additionally or alternatively, the temporal detection block/module 518b may detect and/or extract temporal (e.g., timing, phase) features of the ambience signal 510. For example, the temporal detection block/module 518b may determine when ambient noise occurs in the ambience signal 510, how often and/or how long particular noises tend to occur, etc.

The second control signal 532 provided by the ambience analysis block/module 512 may provide the actual features analyzed (e.g., amplitude, spatial, spectral and/or temporal characteristics, etc.) and/or control information based on the analyzed features (e.g., triggers for amplitude or loudness ramping, etc.). The second control signal 532 may be provided to the masker 536.

The one or more sound sources 528 may provide one or more sound signals 534 to the masker 536. Examples of sound sources 528 include music or sound files (e.g., moving picture experts group (MPEG)-1 or MPEG-2 audio layer 3 (MP3) files, waveform audio file format (WAV) files, musical instrument digital interface (MIDI) files, etc.), synthesized sounds or noise and/or audio inputs or interfaces (for receiving a sound signal 534 from another device, for example), etc. For instance, one sound source 528 may be memory on the wireless communication device 502 that provides music or sound files, while another sound source 528 may be a port used to receive a sound signal 534 from another device. The one or more sound sources 528 may be optional. For example, the masker 536 may only use the voice signal 520 to generate the masking signal 542. Additionally or alternatively, the masker 536 may use a sound signal 534 provided from one or more sound sources 528 to generate a masking signal 542. In some configurations, the sound source 528 and/or sound signal 534 used may be selected based on an input. For example, the transmitting wireless communication device 502 may receive a user input via a user interface (not illustrated in FIG. 5) that indicates a particular sound source 528 and/or sound signal 534 for use. For instance, the transmitting wireless communication device 502 may receive an input using a keyboard, mouse, touchscreen, microphone 504, button, etc. that indicates a selected sound source 528 and/or sound signal 534.

The masker 536 may be a block/module used to generate a masking signal 542. The masking signal 542 may be output as an acoustic masking signal using one or more speakers 544 (e.g., loudspeakers) in order to obscure or mask the acoustic voice signal. The masker 536 may generate the masking signal 542 based on the first control signal 530 and the second control signal 532. As described above, the masking signal 542 may also be based on a sound signal 534 in addition to or alternatively from the voice signal 520. For example, the masking signal 542 may comprise music provided as a sound signal 534 from memory that has been adjusted and/or modified based on the first control signal 530 and the second control signal 532. In another example, the masking signal 542 may comprise the voice signal 520 that has been adjusted (e.g., amplitude modulated) based on the first control signal 530 and the second control signal 532.

The masker 536 may include, for example, a level control block/module 538 and/or a feature control block/module 540. The level control block/module 538 may adjust the level (e.g., amplitude, magnitude, volume, loudness, etc.) of an input signal (e.g., voice signal 520 and/or sound signal 534) based on the first control signal 530 and/or the second control signal 532.

For example, the level control 538 may adjust the input signal amplitude or loudness in a direct relationship with a speech envelope (or threshold triggers based on the speech envelope) provided in the first control signal 530. For instance, if the speech envelope increases in amplitude or loudness, the level control 538 may increase (e.g., ramp up) the amplitude or loudness of the input signal. However, if the speech envelope decreases in amplitude or loudness, the level control 538 may decrease (e.g., ramp down) the amplitude or loudness of the input signal. For example, as a user speaks louder or softer, the wireless communication device 502 may respectively produce a louder or softer acoustic masking signal to effectively obscure the acoustic voice signal. This may provide an acoustic masking signal that is loud enough to obscure the acoustic voice signal without being overpowering or annoying.

Additionally or alternatively, the level control block/module 538 may adjust the level (e.g., amplitude, loudness, etc.) of an input signal (e.g., voice signal 520 and/or sound signal 534) based on the second control signal 532. For example, the level control 538 may adjust the input signal amplitude or loudness in an inverse relationship with an ambience amplitude or loudness (or threshold triggers based on the amplitude or loudness) provided in the second control signal 532. For instance, if the ambience signal 510 increases in amplitude or loudness, the level control 538 may decrease (e.g., ramp down) the amplitude or loudness of the input signal. However, if the ambience signal 510 decreases in amplitude or loudness, the level control 538 may increase (e.g., ramp up) the amplitude or loudness of the input signal. For example, as acoustic ambient signals (e.g., sounds or noise) become louder or softer, the wireless communication device 502 may respectively produce a softer or louder acoustic masking signal. For instance, if the ambient signals (e.g., sounds or noise) are loud enough and/or of the correct characteristics to effectively mask the acoustic voice signal, then the wireless communication device 502 may not need to produce a loud acoustic masking signal. Thus, the masker 536 may operate more efficiently, possibly saving battery power.

The masker 536 may additionally or alternatively include a feature control 540. The feature control 540 may control one or more features of the input signal (e.g., voice signal 520 and/or sound signal 534) based on the first control signal 530 and/or the second control signal 532. For example, the feature control 540 may adjust spectral characteristics of the input signal (e.g., voice signal 520 and/or sound signal 534) based on spectral characteristics of the voice signal 520 and/or the ambience signal 510. For instance, if the second control signal 532 indicates that there is enough low-frequency noise in the acoustic ambient signals (e.g., sounds) to effectively obscure a low-frequency portion of the acoustic voice signal but not enough high-frequency noise in the acoustic ambient signals to effectively obscure a high-frequency portion, then the feature control 540 may (independently or use the level control 538 to) increase the amplitude or loudness in a high frequency portion of a sound signal 534 in order to produce an acoustic masking signal that effectively masks the high-frequency portion of the acoustic voice signal.

In another example, the feature control 540 may adjust the spatial characteristics (e.g., directionality) of the acoustic masking signal based on the first control signal 530 and/or second control signal 532. For instance, the first control signal 530 may indicate the direction of the received acoustic voice signal, while the second control signal 532 may indicate one or more directions of acoustic ambient signals (e.g., sounds). The feature control 540 may use this information to adjust the directionality of the acoustic masking signal, steering it away from the user (e.g., the source of the acoustic voice signal). Additionally or alternatively, the feature control 540 may steer the acoustic masking signal away from strong ambient signals (e.g., sounds) that are sufficient to mask the acoustic voice signal and/or potentially towards quiet ambient signals and/or in directions without acoustic ambient signals. This may help to obscure the acoustic voice signal in directions where it might be more easily overheard, for example. Additionally or alternatively, the feature control 540 may steer the acoustic masking signal in the same direction as the acoustic voice signal is propagating (e.g., away from the user).

It should be noted that the one or more speakers 544 may be transducers (e.g., electroacoustic transducers) that convert an electrical or electronic signal (e.g., the masking signal 542) into an acoustic signal (e.g., the acoustic masking signal). In one configuration, the one or more speakers 544 may be omnidirectional. In other configurations, the one or more speakers 544 may be directional. For example, an array of speakers 544 may be used in some configurations to direct the acoustic masking signal in a particular direction. Additionally or alternatively, the one or more speaker 544 may be placed in different locations on the wireless communication device 502 in order to provide a directional output capability.

The voice signal 520 and/or the ambience signal 510 may be provided to the encoder 554. The encoder 554 may encode the voice signal 520 to produce an encoded voice signal. In some configurations, the encoder 554 may also add error detection and/or correction coding to the encoded voice signal. The encoded voice signal may be provided to a modulator 556. The modulator 556 modulates the encoded voice signal into a particular constellation based on the type of modulation used. Some examples of modulation include quadrature amplitude modulation (QAM), phase shift keying (PSK) modulation, etc. The encoded and modulated voice signal may be provided to a transmitter 558. The transmitter 558 may perform further operations on the encoded and modulated voice signal, such as providing amplification in preparation for transmission. The transmitter 558 may transmit the encoded and modulated voice signal as one or more electromagnetic signals using one or more antennas 560*a-n*. Similar operations may be performed on the ambience signal 510 by the encoder, modulator 556, transmitter 558 and/or antenna(s) 560*a-n* in order to transmit the ambience signal 510 as a noise reference signal. For example, a receiving wireless communication device may use the noise reference signal to suppress noise in a received voice signal.

It should be noted that the wireless communication device 502 may perform additional or alternative operations on the voice signal 520. For example, the wireless communication device 502 may map voice signal 520 and/or ambience signal 510 data to one or more frequencies (e.g., orthogonal frequency division multiplexing (OFDM) subcarriers), time slots, spatial channels, etc.

The wireless communication device 502 may receive one or more electromagnetic signals transmitted from another device (e.g., another wireless communication device) using the one or more antennas 560*a-n*. The receiver 584 may receive the one or more transmitted electromagnetic signals using the one or more antennas 560*a-n*. The received signal may be provided to the demodulator 582. The demodulator 582 demodulates the received signal to produce an encoded signal, which is provided to the decoder 580. The decoder 580 decodes the encoded signal to produce a decoded voice signal, which may be provided to an RVE block/module 578. The RVE block/module 578 may boost different frequency regions of voice to maintain it above a certain noise floor, for example. The output of the RVE block/module 578 (a received voice signal) may be provided to one or more earpiece speakers 576, which may output the received voice signal as an acoustic signal.

In some configurations, the electromagnetic signals received by the wireless communication device 502 may have been relayed by one or more devices. For example, the wireless communication device 502 may receive electromagnetic signals from a base station, which may have received the signals from one or more network devices. These signals may have been received by another base station, from another wireless communication device.

Figure 6:
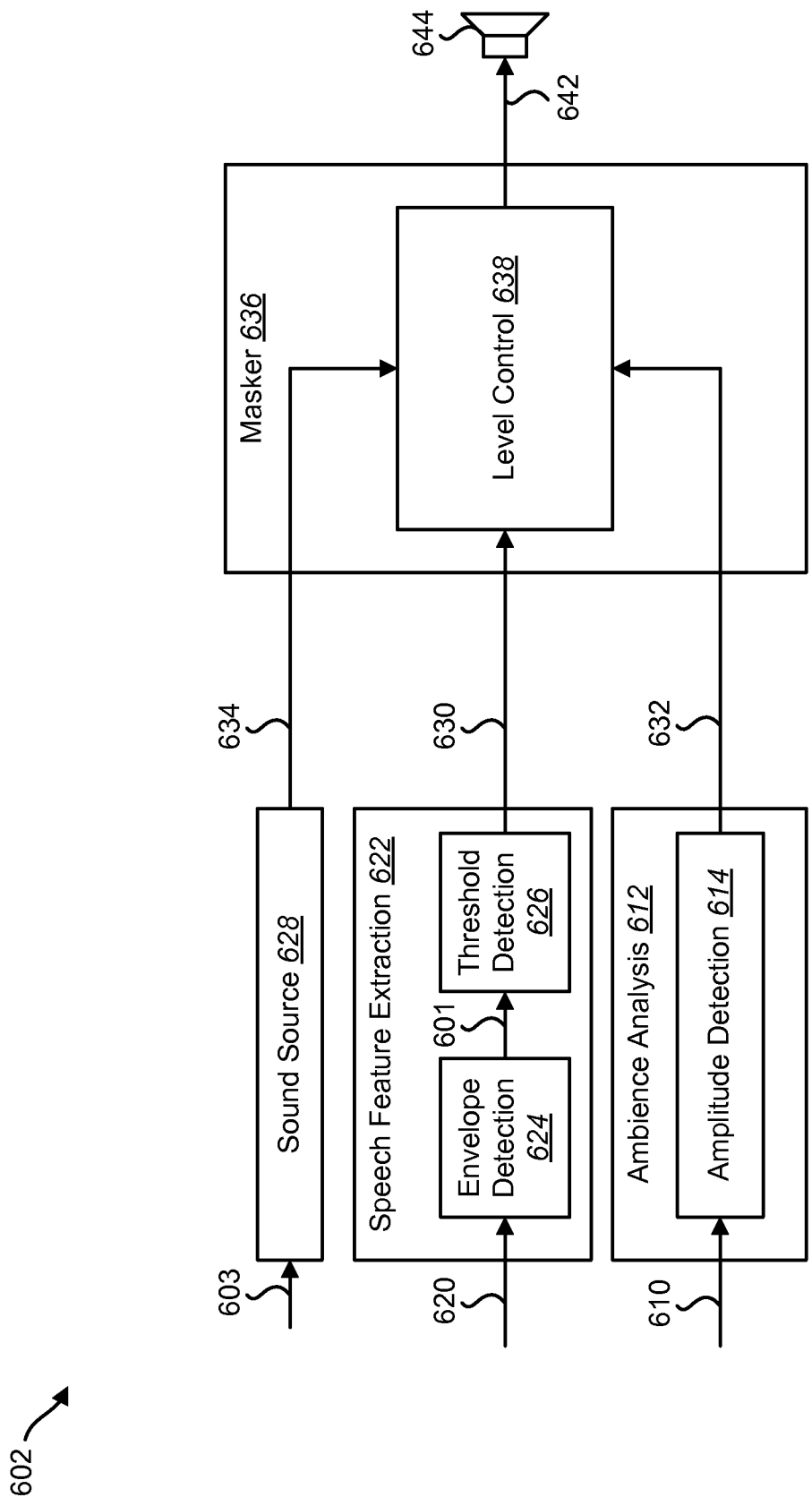
FIG. 6 is a block diagram illustrating one example of generating a masking signal on an electronic device.

FIG. 6 is a block diagram illustrating one example of generating a masking signal 642 on an electronic device 602. The speech feature extraction block/module 622 may be used to extract an amplitude or loudness envelope 601 from a voice signal 620. The speech feature extraction block/module 622 may produce a first control signal 630 based on an envelope signal 601. For example, the speech feature extraction block/module 622 includes an envelope detection block/module 624. The envelope detection block/module 624 determines an envelope signal (e.g., amplitude or loudness envelope) 601 based on the voice signal 620. For example, the voice signal 620 may be characterized as an undulating waveform. The envelope signal 601 may approximately track the positive peaks of the voice signal 620. In other words, the envelope signal 601 may approximately connect the periodic maximum values (e.g., peaks) of the voice signal 620. Thus, the envelope signal 601 may provide an approximation of the amplitude or loudness of the voice signal 620. This amplitude or loudness may be measured or characterized as sound pressure, sound pressure level (e.g., decibels), sound intensity, sound power, sones, phons, volts and/or amperes, etc.

The envelope signal 601 may be provided to a threshold detection block/module 626 included in the speech feature extraction block/module 622. The threshold detection block/module 626 may detect when the envelope signal meets or crosses one or more thresholds. For example, the threshold detection block/module 626 may detect when the envelope signal 601 increases a given amount or decreases a given amount. In one example, several thresholds may be established in a range of amplitudes. In another example, one threshold may be established that is a certain amount or percentage higher than a reference sample or average of the envelope signal 601, while another threshold may be established that is a certain amount or percentage below the reference sample or average. The threshold detection block/module 626 may indicate when a threshold is met or crossed and/or which threshold is met or crossed by the envelope signal 601 as part of the first control signal 630. The first control signal 630 may be provided to the masker 636.

The ambience analysis block/module 612 may analyze the ambience signal 610 to produce a second control signal 632 that is provided to the masker 636. The ambience analysis block/module 612 may include an amplitude (e.g., loudness) detection block/module 614. The amplitude detection block/module 614 may detect or extract an amplitude or loudness of the ambience signal 610. For example, the amplitude or loudness may be measured by detecting an envelope of the ambience signal 610. The amplitude of the ambience signal 610 may be determined similarly to or differently from the envelope 601 of the voice signal 620. For example, the amplitude may be determined as an average of peak values of the ambience signal 610, root mean square (RMS) of the ambience signal 610, etc. This amplitude or loudness may be measured or characterized as sound pressure, sound pressure level (e.g., decibels), sound intensity, sound power, sones, phons, volts and/or amperes, etc. The ambience analysis block/module 612 may determine the second control signal 632 based on the amplitude detected by the amplitude detection block/module 614. For example, the second control signal 632 may indicate particular thresholds that have been met or crossed by the amplitude of the ambience signal 610. In another example, the second control signal 632 may be the amplitude of the ambience signal 610 as determined by the ambience analysis block/module 612. The second control signal 632 may be provided to the masker 636.

The sound source 628 may provide one or more sound signals 634 to the masker 636. Examples of sound sources 628 include music or sound files, synthesized sounds or noise and/or audio inputs or interfaces (for receiving a sound signal 634 from another device, for example), etc. For instance, one sound source 628 may be memory on the electronic device 602 that provides music or sound files, while another sound source 628 may be a port used to receive a sound signal 634 from another device. In the example illustrated in FIG. 6, the sound source 628 may provide a sound signal 634 (e.g., input signal) to the masker 636. In some configurations, the sound signal 634 provided to the masker may be selected based on a selection input 603. For example, a user may select a music file containing a song by his favorite band. The corresponding sound signal 634 may then be provided to the masker 636.

The masker 636 may be a block/module used to generate a masking signal 642. The masking signal 642 may be output as an acoustic masking signal using one or more speakers 644 (e.g., loudspeakers) in order to obscure or mask an acoustic voice signal. The masker 636 may generate the masking signal 642 based on the sound signal 634, the first control signal 630 and the second control signal 632. For example, the masking signal 642 may comprise music provided as a sound signal 634 from memory that has been adjusted and/or modified based on the first control signal 630 and the second control signal 632.

In this example, the masker 636 includes a level control block/module 638. The level control block/module 638 may adjust the level (e.g., amplitude, magnitude, volume, loudness, etc.) of the sound signal 634 based on the first control signal 630 and the second control signal 632. For example, the level control 638 may adjust the sound signal 634 amplitude or loudness in a direct relationship with a speech envelope using threshold triggers provided in the first control signal 630. For instance, if the speech envelope 601 increases in amplitude or loudness, the level control 638 may increase (e.g., ramp up) the amplitude or loudness of the input signal. However, if the speech envelope decreases in amplitude or loudness, the level control 638 may decrease (e.g., ramp down) the amplitude or loudness of the input signal. For example, as a user speaks louder or softer, the electronic device 602 may respectively produce a louder or softer acoustic masking signal to effectively obscure an acoustic voice signal. This may provide an acoustic masking signal that is loud enough to obscure the acoustic voice signal without being overpowering or annoying.

In some configurations, the level control 638 may (initially) ramp the sound signal 634 to a certain level in relation to the voice signal 620. For example, the level control 638 may initially (before other adjustments are made) ramp the sound signal 634 such that it is a number of decibels louder than the voice signal 620.

Additionally or alternatively, the level control block/module 638 may adjust the level (e.g., amplitude, loudness, etc.) of the sound signal 634 based on the second control signal 632. For example, the level control 638 may adjust the sound signal 634 amplitude or loudness in an inverse relationship with an ambience amplitude or loudness (using threshold triggers based on the amplitude or loudness, for example) provided in the second control signal 632. For instance, if the ambience signal 610 increases in amplitude or loudness, the level control 638 may decrease (e.g., ramp down) the amplitude or loudness of the sound signal 634. However, if the ambience signal 610 decreases in amplitude or loudness, the level control 638 may increase (e.g., ramp up) the amplitude or loudness of the sound signal 634. For example, as acoustic ambient signals (e.g., sounds or noise) become louder or softer, the wireless communication device 602 may respectively produce a softer or louder acoustic masking signal. For instance, if the ambient signals (e.g., sounds or noise) are loud enough and/or of the correct characteristics to effectively mask the acoustic voice signal, then the wireless communication device 602 may not need to produce a loud acoustic masking signal. Thus, the masker 636 may operate more efficiently, possibly saving battery power.

In some configurations, the level control 638 may ramp the sound signal 634 such that the sound signal 634 in combination with the ambience signal 610 is at a certain level in relation to the ambience signal 610. For example, if the ambience signal 610 in combination with the sound signal 634 (after adjusting the sound signal 634 based on a speech feature, for example) is not a certain number of decibels louder than the voice signal 620 (at least), the level control 638 may increase (e.g., ramp up) the sound signal 634 amplitude such that the combination of the ambience signal 610 and the sound signal 634 is a number of decibels louder than the voice signal 620. However, if the sound signal 634 in combination with the ambience signal 610 is greater than a number of decibels louder than the voice signal 620, the level control 638 may decrease (e.g., ramp down) the sound signal 634 until the sound signal 634 in combination with the ambience signal 610 is a number of decibels louder than the voice signal 620 and/or until the sound signal 634 is decreased to a certain level (e.g., no amplitude and/or a set level).

The sound signal 634 that has been modified and/or adjusted based on the speech feature (e.g., the first control signal 630) and the ambience feature (e.g., the second control signal 632) may be the masking signal 642 provided to the speaker 644. The speaker 644 may convert the masking signal 642 from an electrical or electronic signal into an acoustic masking signal. It should be noted that in the example described in FIG. 6, only amplitude (e.g., loudness, volume) characteristics of the sound signal 634 may be adjusted. In other examples and/or configurations, however, additional or alternative characteristics (e.g., spatial, spectral and/or temporal characteristics, etc.) may be used to adjust and/or modify the sound signal 634 (and/or a voice signal 620).

Figure 7:
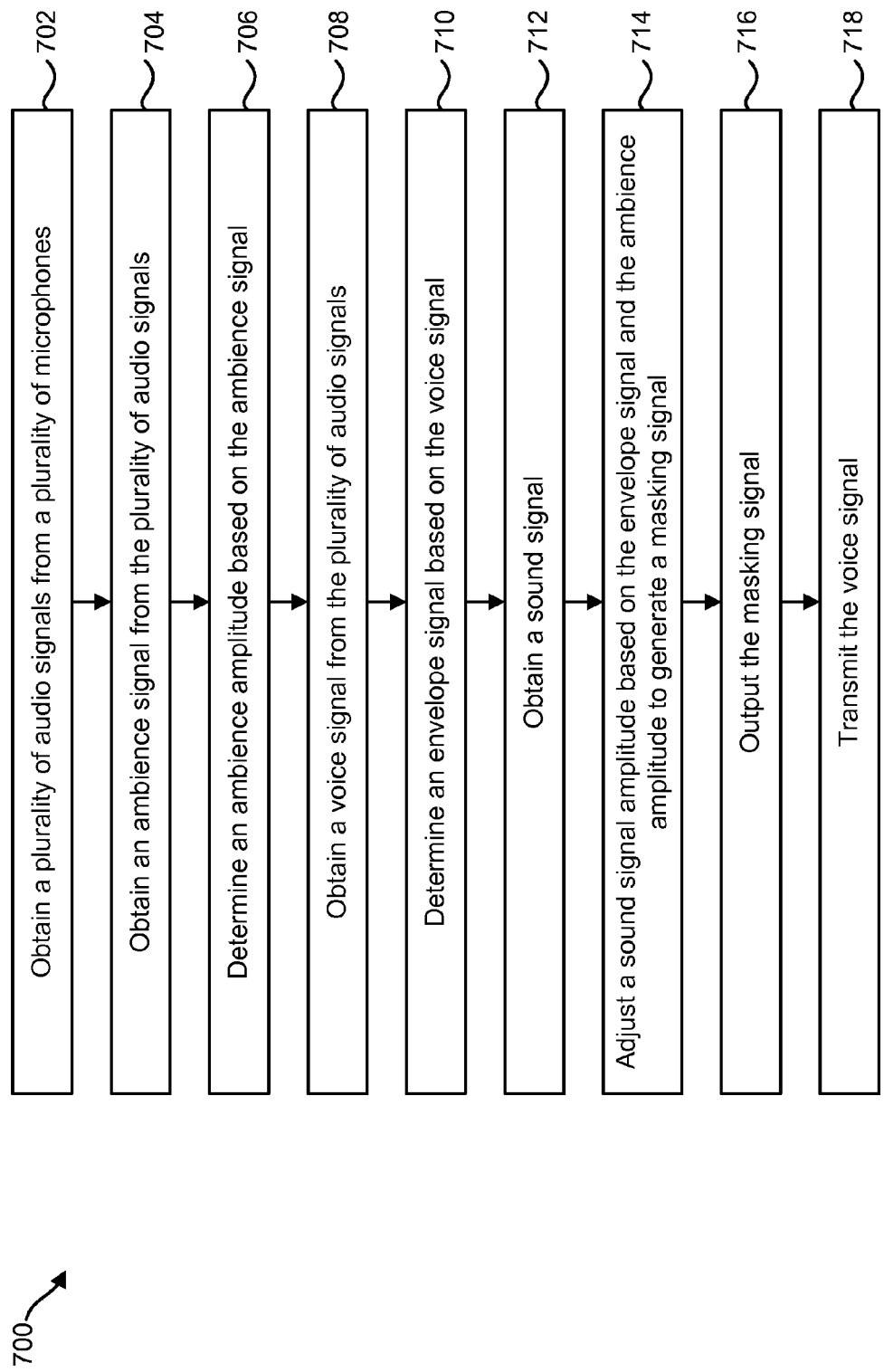
FIG. 7 is a flow diagram illustrating one configuration of a method for generating a masking signal on a wireless communication device.

FIG. 7 is a flow diagram illustrating a configuration of a method 700 for generating a masking signal 542 on a wireless communication device 502. The wireless communication device 502 may obtain 702 a plurality of audio signals from a plurality of microphones 504*a-n*. For example, the plurality of microphones 504*a-n* may convert an acoustic voice signal and/or one or more acoustic ambient signals into electrical or electronic audio signals.

The wireless communication device 502 may obtain 704 an ambience signal 510 from the plurality of audio signals. For example, the wireless communication device 502 may estimate ambient sounds and/or noise in the audio signals. In one configuration, the wireless communication device 502 may use a voice activity detector 594 to estimate the ambient sounds and/or noise in the audio signals.

The wireless communication device 502 may determine 706 an ambience amplitude (e.g., ambience signal 510 amplitude) based on the ambience signal 510. For instance, the wireless communication device 502 may determine 706 an amplitude (e.g., loudness) envelope of the ambience signal 510. This may be done, for example, by using a low-pass filter, calculating an RMS value of the ambience signal 510 and/or calculating an average maximum peak value, interpolating maximum peak values, etc. In some configurations, the wireless communication device 502 may generate a second control signal 532 based on the ambience amplitude.

The wireless communication device 502 may obtain 708 a voice signal 520 from the plurality of audio signals. For example, the wireless communication device 502 may separate the voice signal 520 from the audio signals. In one configuration, the wireless communication device 502 may subtract or remove a noise estimate (e.g., the ambience signal 510) from the audio signals in order to estimate the voice signal 520.

The wireless communication device 502 may determine 710 an envelope signal based on the voice signal 520. This may be done, for example, by using a low-pass filter, calculating an RMS value of the voice signal 520 and/or calculating an average maximum peak value, interpolating maximum peak values, etc. The envelope signal may represent an amplitude, magnitude, loudness, etc. of the voice signal 520, for instance. In some configurations, the wireless communication device 502 may generate a first control signal 530 based on the envelope signal.

The wireless communication device 502 may obtain 712 a sound signal 534. For example, the wireless communication device 502 may obtain 712 music or sound files (e.g., MP3 files, WAV files, MIDI files, etc.), synthesized sounds or noise and/or an audio input (from another device, for example), etc. In one configuration, the wireless communication device 502 retrieves a sound signal 534 from memory. Additionally or alternatively, the wireless communication device 502 may synthesize sounds or noise using an algorithm and/or stored data. Additionally or alternatively, the wireless communication device 502 retrieves a sound signal 534 from a removable memory device, such as a secure digital (SD) card, universal serial bus (USB) thumb drive, etc. In one configuration, the wireless communication device 502 may obtain 712 a sound signal 534 based on a selection input. For example, a user may designate a particular sound source 528 or sound signal 534 to use as a masking signal 542 (with modification and/or adjustments in accordance with the systems and methods herein). For instance, a user may want to use a particular source, song and/or sound for the masking signal 542, which may be indicated by the selection input.

The wireless communication device 502 may adjust 714 a sound signal 534 amplitude based on the envelope signal (e.g., the first control signal 530) and the ambience amplitude (e.g., the second control signal 532) to generate a masking signal 542. For example, the wireless communication device 502 may adjust 714 the sound signal 534 amplitude, magnitude, loudness or volume based on the envelope signal and the ambience amplitude to generate the masking signal 542. In one configuration, the wireless communication device 502 adjusts the sound signal 534 amplitude or loudness in a direct relationship with a voice envelope (e.g., amplitude or loudness envelope) and adjusts the signal amplitude or loudness in an inverse relationship with an ambience amplitude or loudness (e.g., amplitude or loudness envelope). This may be done as described in connection with FIG. 6 above.

The wireless communication device 502 may output 716 the masking signal 542. For example, the wireless communication device 502 may provide the masking signal 542 to one or more speakers 544, which may convert the masking signal 542 into an acoustic masking signal.

The wireless communication device 502 may transmit 718 the voice signal 520. For example, the wireless communication device 502 may encode, modulate, amplify and/or transmit 718 the voice signal 520. The voice signal 520 may be transmitted as one or more electromagnetic signals using one or more antennas 560$a$-$n$. Before transmission, the wireless communication device 502 may additionally or alternatively map the voice signal 520 data to one or more spatial streams, antennas, frequencies (e.g., subcarriers), time slots, etc.

Figure 8:
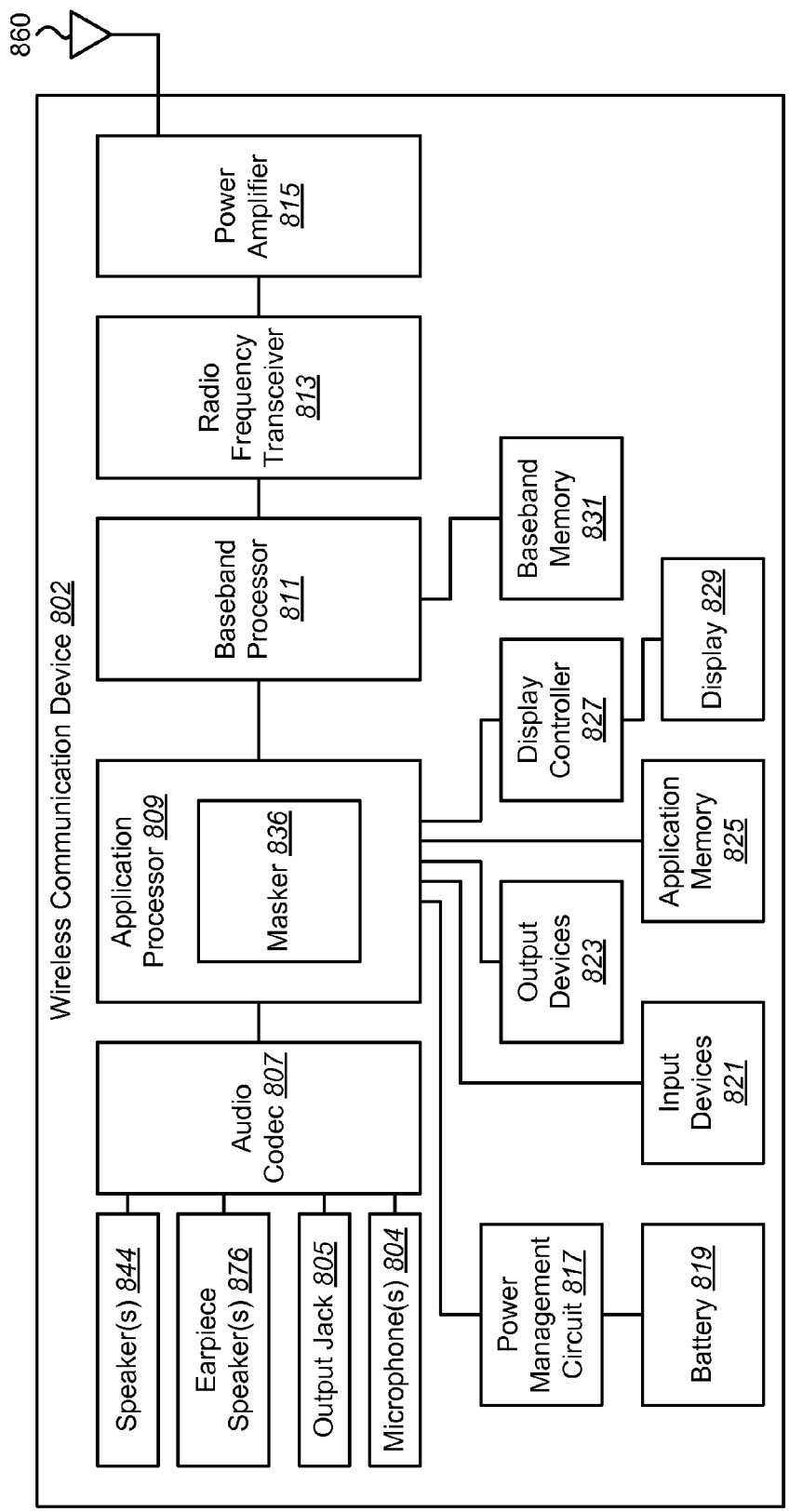
FIG. 8 is a block diagram illustrating one configuration of several components in a wireless communication device in which systems and methods for generating a masking signal may be implemented.

FIG. 8 is a block diagram illustrating one configuration of several components in a wireless communication device 802 in which systems and methods for generating a masking signal may be implemented. The wireless communication device 802 may include an application processor 809. The application processor 809 generally processes instructions (e.g., runs programs) to perform functions on the wireless communication device 802. The application processor 809 may be coupled to an audio coder/decoder (codec) 807.

The audio codec 807 may be an electronic device (e.g., integrated circuit) used for coding and/or decoding audio signals. The audio codec 807 may be coupled to one or more speakers 844, one or more earpiece speakers 876, an output jack 805 and/or one or more microphones 804. The speakers 844 may include one or more electro-acoustic transducers that convert electrical or electronic signals into acoustic signals. For example, the speakers 844 may be used to play music or output a speakerphone conversation, etc. The one or more earpiece speakers 876 may include one or more speakers or electro-acoustic transducers that can be used to output acoustic signals (e.g., speech signals) to a user. For example, one or more earpiece speakers 876 may be used such that only a user may reliably hear the acoustic signal. The output jack 805 may be used for coupling other devices to the wireless communication device 802 for outputting audio, such as headphones. The speakers 844, one or more earpiece speakers 876 and/or output jack 805 may generally be used for outputting an audio signal from the audio codec 807. The one or more microphones 804 may be acousto-electric transducers that convert an acoustic signal (such as a user's voice) into electrical or electronic signals that are provided to the audio codec 807.

The application processor 809 may include a masker block/module 836. The masker block/module 836 may be used to generate a masking signal in accordance with the systems and methods disclosed herein. It should be noted that the wireless communication device 802 may be configured similarly to and/or may be an example of the electronic devices 102, 602, transmitting wireless communication device 302 and/or wireless communication device 502 described above. For example, the wireless communication device 802 may perform one or more of the methods 200, 400, 700 described above. More specifically, the masker 836 may be configured similarly to the maskers 136, 336, 536, 636 described above. Although the masker block/module 836 is illustrated as being implemented in the application processor 809, the masker block/module 836 may additionally or alternatively be implemented in a digital signal processor (DSP) or in other similar blocks/modules.

The application processor 809 may be coupled to a power management circuit 817. One example of a power management circuit 817 is a power management integrated circuit (PMIC), which may be used to manage the electrical power consumption of the wireless communication device 802. The power management circuit 817 may be coupled to a battery 819. The battery 819 may generally provide electrical power to the wireless communication device 802.

The application processor 809 may be coupled to one or more input devices 821 for receiving input. Examples of input devices 821 include infrared sensors, image sensors, accelerometers, touch sensors, keypads, etc. The input devices 821 may allow user interaction with the wireless communication device 802. The application processor 809 may also be coupled to one or more output devices 823. Examples of output devices 823 include printers, projectors, screens, haptic devices, etc. The output devices 823 may allow the wireless communication device 802 to produce output that may be experienced by a user.

The application processor 809 may be coupled to application memory 825. The application memory 825 may be any electronic device that is capable of storing electronic information. Examples of application memory 825 include double data rate synchronous dynamic random access memory (DDRAM), synchronous dynamic random access memory (SDRAM), flash memory, etc. The application memory 825 may provide storage for the application processor 809. For instance, the application memory 825 may store data and/or instructions for the functioning of programs that are run on the application processor 809. In one configuration, the application memory 825 may store and/or provide data and/or instructions for performing one or more of the methods 200, 400, 700 described above.

The application processor 809 may be coupled to a display controller 827, which in turn may be coupled to a display 829. The display controller 827 may be a hardware block that is used to generate images on the display 829. For example, the display controller 827 may translate instructions and/or data from the application processor 809 into images that can be presented on the display 829. Examples of the display 829 include liquid crystal display (LCD) panels, light emitting diode (LED) panels, cathode ray tube (CRT) displays, plasma displays, etc.

The application processor 809 may be coupled to a baseband processor 811. The baseband processor 811 generally processes communication signals. For example, the baseband processor 811 may demodulate and/or decode received signals. Additionally or alternatively, the baseband processor 811 may encode and/or modulate signals in preparation for transmission.

The baseband processor 811 may be coupled to baseband memory 831. The baseband memory 831 may be any electronic device capable of storing electronic information, such as SDRAM, DDRAM, flash memory, etc. The baseband processor 811 may read information (e.g., instructions and/or data) from and/or write information to the baseband memory 831. Additionally or alternatively, the baseband processor 811 may use instructions and/or data stored in the baseband memory 831 to perform communication operations.

The baseband processor 811 may be coupled to a radio frequency (RF) transceiver 813. The RF transceiver 813 may be coupled to a power amplifier 815 and one or more antennas 860. The RF transceiver 813 may transmit and/or receive radio frequency signals. For example, the RF transceiver 813 may transmit an RF signal using a power amplifier 815 and one or more antennas 860. The RF transceiver 813 may also receive RF signals using the one or more antennas 860.

Figure 9:
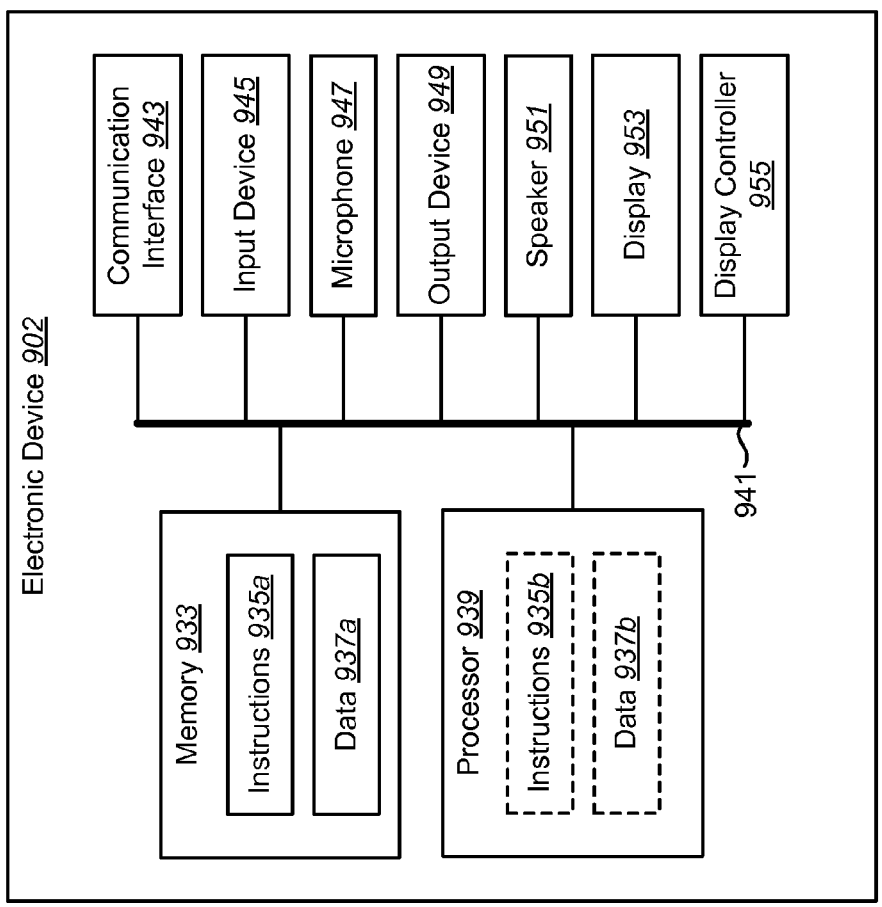
FIG. 9 illustrates various components that may be utilized in an electronic device.

FIG. 9 illustrates various components that may be utilized in an electronic device 902. The illustrated components may be located within the same physical structure or in separate housings or structures. One or more of the electronic devices 102, 602 and/or wireless communication devices 302, 502, 802 described previously may be configured similarly to the electronic device 902. The electronic device 902 includes a processor 939. The processor 939 may be a general purpose single- or multi-chip microprocessor (e.g., an ARM), a special purpose microprocessor (e.g., a digital signal processor (DSP)), a microcontroller, a programmable gate array, etc. The processor 939 may be referred to as a central processing unit (CPU). Although just a single processor 939 is shown in the electronic device 902 of FIG. 9, in an alternative configuration, a combination of processors 939 (e.g., an ARM and DSP) could be used.

The electronic device 902 also includes memory 933 in electronic communication with the processor 939. That is, the processor 939 can read information from and/or write information to the memory 933. The memory 933 may be any electronic component capable of storing electronic information. The memory 933 may be random access memory (RAM), read-only memory (ROM), magnetic disk storage media, optical storage media, flash memory devices in RAM, on-board memory included with the processor 939, programmable read-only memory (PROM), erasable programmable read-only memory (EPROM), electrically erasable PROM (EEPROM), registers, and so forth, including combinations thereof.

Data 937a and instructions 935a may be stored in the memory 933. The instructions 935a may include one or more programs, routines, sub-routines, functions, procedures, etc. The instructions 935a may include a single computer-readable statement or many computer-readable statements. The instructions 935a may be executable by the processor 939 to implement one or more of the methods 200, 400, 700 described above. Executing the instructions 935a may involve the use of the data 937a that is stored in the memory 933. FIG. 9 shows some instructions 935b and data 937b being loaded into the processor 939 (which may come from instructions 935a and data 937a).

The electronic device 902 may also include one or more communication interfaces 943 for communicating with other electronic devices 902. The communication interface 943 may be based on wired communication technology, wireless communication technology, or both. Examples of different types of communication interfaces 943 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

The electronic device 902 may also include one or more input devices 945 and one or more output device 949. Examples of different kinds of input devices 945 include a keyboard, mouse, microphone, remote control device, button, joystick, trackball, touchpad, lightpen, etc. For instance, the electronic device 902 may include one or more microphones 947 for capturing acoustic signals. In one configuration, a microphone 947 may be a transducer that converts acoustic signals (e.g., voice, speech) into electrical or electronic signals. Examples of different kinds of output devices 949 include a speaker, printer, etc. For instance, the electronic device 902 may include one or more speakers 951. In one configuration, a speaker 951 may be a transducer that converts electrical or electronic signals into acoustic signals. One specific type of output device 949 which may be typically included in an electronic device 902 is a display device 953. Display devices 953 used with configurations disclosed herein may utilize any suitable image projection technology, such as a cathode ray tube (CRT), liquid crystal display (LCD), light-emitting diode (LED), gas plasma, electroluminescence, or the like. A display controller 955 may also be provided, for converting data 937a stored in the memory 933 into text, graphics, and/or moving images (as appropriate) shown on the display device 953.

The various components of the electronic device 902 may be coupled together by one or more buses, which may include a power bus, a control signal bus, a status signal bus, a data bus, etc. For simplicity, the various buses are illustrated in FIG. 9 as a bus system 941. It should be noted that FIG. 9 illustrates only one possible configuration of an electronic device 902. Various other architectures and components may be utilized.

Figure 10:
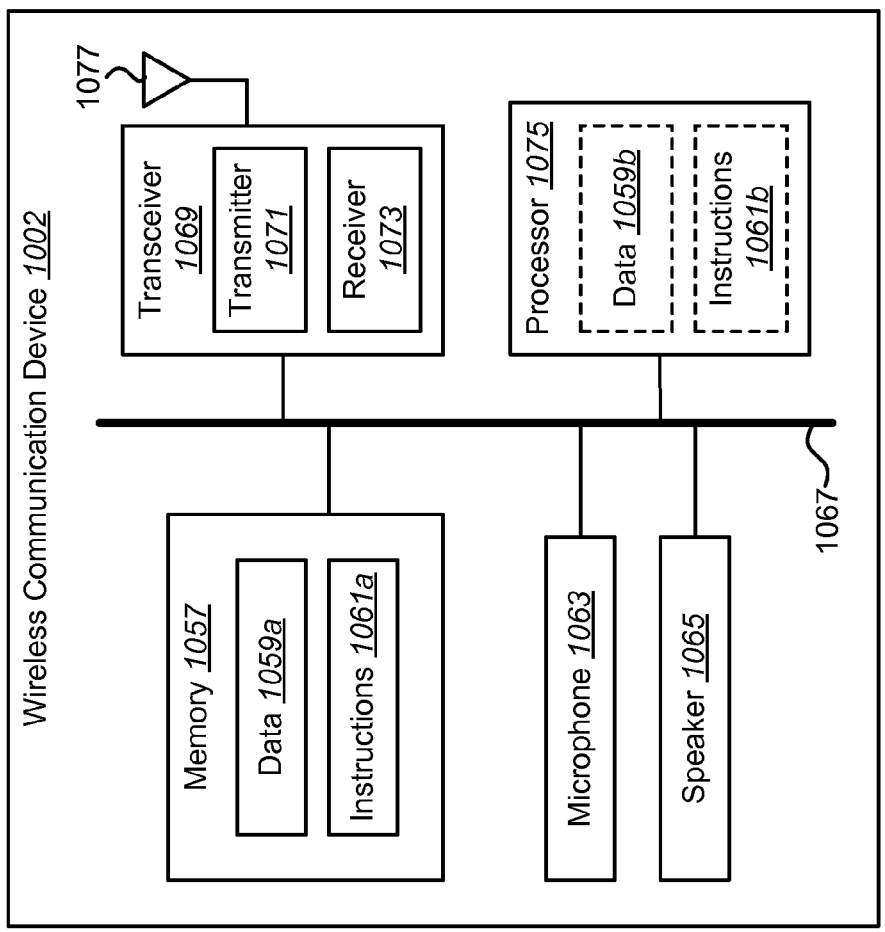
FIG. 10 illustrates certain components that may be included within a wireless communication device.

FIG. 10 illustrates certain components that may be included within a wireless communication device 1002. One or more of the electronic devices 102, 602 and/or the wireless communication devices 302, 502, 802 described above may be configured similarly to the wireless communication device 1002 that is shown in FIG. 10.

The wireless communication device 1002 includes a processor 1075. The processor 1075 may be a general purpose single- or multi-chip microprocessor (e.g., an ARM), a special purpose microprocessor (e.g., a digital signal processor (DSP)), a microcontroller, a programmable gate array, etc. The processor 1075 may be referred to as a central processing unit (CPU). Although just a single processor 1075 is shown in the wireless communication device 1002 of FIG. 10, in an alternative configuration, a combination of processors 1075 (e.g., an ARM and DSP) could be used.

The wireless communication device 1002 also includes memory 1057 in electronic communication with the processor 1075 (i.e., the processor 1075 can read information from and/or write information to the memory 1057). The memory 1057 may be any electronic component capable of storing electronic information. The memory 1057 may be random access memory (RAM), read-only memory (ROM), magnetic disk storage media, optical storage media, flash memory devices in RAM, on-board memory included with the processor 1075, programmable read-only memory (PROM), erasable programmable read-only memory (EPROM), electrically erasable PROM (EEPROM), registers, and so forth, including combinations thereof.

Data 1059a and instructions 1061a may be stored in the memory 1057. The instructions 1061a may include one or more programs, routines, sub-routines, functions, procedures, code, etc. The instructions 1061a may include a single computer-readable statement or many computer-readable statements. The instructions 1061a may be executable by the processor 1075 to implement one or more of the methods 200, 400, 700 described above. Executing the instructions 1061a may involve the use of the data 1059a that is stored in the memory 1057. FIG. 10 shows some instructions 1061b and data 1059b being loaded into the processor 1075 (which may come from instructions 1061a and data 1059a in memory 1057).

The wireless communication device 1002 may also include a transmitter 1071 and a receiver 1073 to allow transmission and reception of signals between the wireless communication device 1002 and a remote location (e.g., another electronic device, wireless communication device, etc.). The transmitter 1071 and receiver 1073 may be collectively referred to as a transceiver 1069. An antenna 1077 may be electrically coupled to the transceiver 1069. The wireless communication device 1002 may also include (not shown) multiple transmitters 1071, multiple receivers 1073, multiple transceivers 1069 and/or multiple antenna 1077.

In some configurations, the wireless communication device 1002 may include one or more microphones 1063 for capturing acoustic signals. In one configuration, a microphone 1063 may be a transducer that converts acoustic signals (e.g., voice, speech) into electrical or electronic signals. Additionally or alternatively, the wireless communication device 1002 may include one or more speakers 1065. In one configuration, a speaker 1065 may be a transducer that converts electrical or electronic signals into acoustic signals.

The various components of the wireless communication device 1002 may be coupled together by one or more buses, which may include a power bus, a control signal bus, a status signal bus, a data bus, etc. For simplicity, the various buses are illustrated in FIG. 10 as a bus system 1067.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. An electronic device for generating a masking signal, comprising: a plurality of microphones;
　a speaker;
　a processor;
　memory in electronic communication with the processor;
　instructions stored in the memory, the instructions being executable to:
　　obtain a plurality of audio signals from the plurality of microphones;
　　obtain an ambience signal from the plurality of audio signals;
　　determine an ambience feature based on the ambience signal;
　　obtain a voice signal from the plurality of audio signals;
　　determine a voice feature based on the voice signal, wherein the voice feature comprises a loudness envelope;
　　obtain a sound signal;
　　generate a masking signal based on the voice feature, the ambience feature, and the sound signal, wherein generating the masking signal comprises adjusting the sound signal based on the ambience feature and the voice feature; and
　　output the masking signal using the speaker, wherein the masking signal obscures an acoustic voice signal.

2. The electronic device of claim 1, wherein the sound signal comprises music.

3. The electronic device of claim 1, wherein adjusting the sound signal comprises adjusting the amplitude of the sound signal in a direct relationship with an envelope signal based on the voice signal.

4. The electronic device of claim 3, wherein adjusting the sound signal further comprises adjusting the amplitude of the sound signal in an inverse relationship with an amplitude based on the ambience signal.

5. The electronic device of claim 1, wherein the sound signal is selected based on an input.

6. The electronic device of claim 1, wherein the voice feature comprises one selected from a group consisting of amplitude characteristics, spectral characteristics, spatial characteristics and temporal characteristics.

7. The electronic device of claim 1, wherein a masking level is controlled based on at least one ramp time.

8. The electronic device of claim 1, wherein the ambience feature comprises one selected from a group consisting of amplitude characteristics, spectral characteristics, spatial characteristics and temporal characteristics.

9. The electronic device of claim 1, wherein the ambience feature comprises a loudness characteristic.

10. The electronic device of claim 1, wherein obtaining the voice signal comprises removing the ambience signal from the plurality of audio signals.

11. The electronic device of claim 1, wherein obtaining the voice signal comprises removing one or more echo signals from the plurality of audio signals using an echo canceller.

12. The electronic device of claim 1, wherein the instructions are further executable to transmit the voice signal.

13. The electronic device of claim 1, wherein generating the masking signal comprises amplitude modulating the voice signal based on the voice feature.

14. The electronic device of claim 1, wherein the electronic device is a wireless communication device.

15. The electronic device of claim 1, further comprising a plurality of speakers.

16. A method for generating a masking signal on an electronic device, comprising:
   obtaining a plurality of audio signals from a plurality of microphones;
   obtaining an ambience signal from the plurality of audio signals;
   determining an ambience feature based on the ambience signal; obtaining a voice signal from the plurality of audio signals;
   determining a voice feature based on the voice signal, wherein the voice feature comprises a loudness envelope;
   obtaining a sound signal;
   generating a masking signal based on the voice feature, the ambience feature, and the sound signal, wherein generating the masking signal comprises adjusting the sound signal based on the ambience feature and the voice feature; and
   outputting the masking signal using a speaker, wherein the masking signal obscures an acoustic voice signal.

17. The method of claim 16, wherein the sound signal comprises music.

18. The method of claim 16, wherein adjusting the sound signal comprises adjusting the amplitude of the sound signal in a direct relationship with an envelope signal based on the voice signal.

19. The method of claim 18, wherein adjusting the sound signal further comprises adjusting the amplitude of the sound signal in an inverse relationship with an amplitude based on the ambience signal.

20. The method of claim 16, wherein the sound signal is selected based on an input.

21. The method of claim 16, wherein the voice feature comprises one selected from a group consisting of amplitude characteristics, spectral characteristics, spatial characteristics and temporal characteristics.

22. The method of claim 16, wherein a masking level is controlled based on at least one ramp time.

23. The method of claim 16, wherein the ambience feature comprises one selected from a group consisting of amplitude characteristics, spectral characteristics, spatial characteristics and temporal characteristics.

24. The method of claim 16, wherein the ambience feature comprises a loudness characteristic.

25. The method of claim 16, wherein obtaining the voice signal comprises removing the ambience signal from the plurality of audio signals.

26. The method of claim 16, wherein obtaining the voice signal comprises removing one or more echo signals from the plurality of audio signals using an echo canceller.

27. The method of claim 16, wherein the instructions are further executable to transmit the voice signal.

28. The method of claim 16, wherein generating the masking signal comprises amplitude modulating the voice signal based on the voice feature.

29. The method of claim 16, wherein the electronic device is a wireless communication device.

30. The method of claim 16, wherein the electronic device comprises a plurality of speakers.

31. A computer-program product for generating a masking signal, comprising a non-transitory tangible computer-readable medium having instructions thereon, the instructions comprising:
   code for causing an electronic device to obtain a plurality of audio signals from a plurality of microphones;
   code for causing the electronic device to obtain an ambience signal from the plurality of audio signals;
   code for causing the electronic device to determine an ambience feature based on the ambience signal;
   code for causing the electronic device to obtain a voice signal from the plurality of audio signals;
   code for causing the electronic device to determine a voice feature based on the voice signal, wherein the voice feature comprises a loudness envelope;
   code for causing the electronic device to obtain a sound signal;
   code for causing the electronic device to generate a masking signal based on the voice feature, the ambience feature, and the sound signal, wherein generating the masking signal comprises adjusting the sound signal based on the ambience feature and the voice feature; and
   code for causing the electronic device to output the masking signal using a speaker, wherein the masking signal obscures an acoustic voice signal.

32. The computer-program product of claim 31, wherein adjusting the sound signal comprises adjusting the amplitude of the sound signal in a direct relationship with an envelope signal based on the voice signal.

33. The computer-program product of claim 32, wherein adjusting the sound signal further comprises adjusting the amplitude of the sound signal in an inverse relationship with an amplitude based on the ambience signal.

34. The computer-program product of claim 31, wherein the sound signal is selected based on an input.

35. The computer-program product of claim 31, wherein obtaining the voice signal comprises removing one or more echo signals from the plurality of audio signals using an echo canceller.

36. An apparatus for generating a masking signal, comprising:
   means for obtaining a plurality of audio signals from a plurality of microphones;
   means for obtaining an ambience signal from the plurality of audio signals;
   means for determining an ambience feature based on the ambience signal;
   means for obtaining a voice signal from the plurality of audio signals;

means for determining a voice feature based on the voice signal, wherein the voice feature comprises a loudness envelope;

means for obtaining a sound signal;

means for generating a masking signal based on the voice feature, the ambience feature, and the sound signal, wherein generating the masking signal comprises adjusting the sound signal based on the ambience feature and the voice feature; and means for outputting the masking signal using a speaker, wherein the masking signal obscures an acoustic voice signal.

37. The apparatus of claim 36, wherein adjusting the sound signal comprises adjusting the amplitude of the sound signal in a direct relationship with an envelope signal based on the voice signal.

38. The apparatus of claim 37, wherein signal adjusting the sound signal further comprises adjusting the amplitude of the sound signal in an inverse relationship with an amplitude based on the ambience signal.

39. The apparatus of claim 36, wherein the sound signal is selected based on an input.

40. The apparatus of claim 36, wherein obtaining the voice signal comprises removing one or more echo signals from the plurality of audio signals using an echo canceller.

* * * * *